United States Patent [19]
Kim

[11] Patent Number: 4,637,722
[45] Date of Patent: Jan. 20, 1987

[54] FIBER OPTICAL ROTATION SENSOR WITH EXTENDED DYNAMIC RANGE

[75] Inventor: Byoung Y. Kim, Stanford, Calif.

[73] Assignee: The Board of Trustees of the Leland Stanford Junior University, Stanford, Calif.

[21] Appl. No.: 488,155

[22] Filed: Apr. 25, 1983

[51] Int. Cl.$^4$ .............................................. G01B 9/02
[52] U.S. Cl. ................................................... 356/350
[58] Field of Search ......................................... 356/350

[56] References Cited

U.S. PATENT DOCUMENTS 4,299,490 11/1981 Cahill et al. ......................... 356/350
4,372,685 2/1983 Ulrich .................................. 356/350
4,410,275 10/1983 Shaw et al. ......................... 356/350

FOREIGN PATENT DOCUMENTS 2100855 1/1983 United Kingdom ................ 356/350

OTHER PUBLICATIONS

R. A. Bergh, et al., "All-Single-Mode Fiber-Optic Gyroscope", *Optics Letters*, vol. 6., No. 4, Apr. 1981.
R. A. Bergh, et al., "All-Single-Mode Fiber-Optic Gyroscope With Long-Term Stability", *Optics Letters*, vol. 6, No. 10, Oct. 1981.
H. C. Lefevre, et al., "All-Fiber Gyroscope With Inertial-Navigation Short-Term Sensitivity", *Optics Letters*, vol. 7, No. 9, Sep. 1982.
R. Ulrich, "Fiber-Optic Rotation Sensing With Low Drift", *Optics Letters*, vol. 5, No. 5, May 1980.
"Techniques For Shot Noise Limited Inertial Rotation Measurement Using a Multiturn Fiber Sagnac Interferometer", SPIE, Davis et al., 1978, pp. 131–136.

*Primary Examiner*—David C. Nelms
*Assistant Examiner*—S. A. Turner
*Attorney, Agent, or Firm*—Knobbe, Martens, Olson & Bear

[57] ABSTRACT

A fiber optic rotation sensor, employing the Sagnac effect comprising all fiber optic components positioned along a continuous, uninterrupted strand of fiber optic material. The rotation sensor includes a detection system utilizing a modulator or modulators for phase modulating at first and second harmonic frequencies light waves which counter-propagate through a loop formed in the fiber optic strand. Each modulator is operated at a specific frequency to eliminate amplitude modulation in the detected optical output signal. A phase sensitive detector generates a feedback error signal proportional to the magnitude of the first harmonic in the output optical signal. The feedback error signal controls a modulator which controls the amplitude of the second harmonic driving signal for the second harmonic phase modulator such that the first harmonic component in the output signal from the rotation sensor is cancelled or held within a small range of amplitudes.

34 Claims, 24 Drawing Figures

ZERO ROTATION CASE

FIBER OPTICAL ROTATION SENSOR WITH EXTENDED DYNAMIC RANGE

BACKGROUND OF THE INVENTION

The present invention relates to rotation sensors, such as gyroscopes, and particularly to a fiber optic rotation sensor which has an extended dynamic range.

Fiber optic rotation sensors typically comprise a loop of fiber optic material to which light waves are coupled for propagation around the loop in opposite directions. Rotation of the loop creates a relative phase difference between counter-propagating waves, in accordance with the well known "Sagnac effect", with the amount of phase difference corresponding to the velocity of rotation. The counter-propagating waves, when recombined, interfere constructively or destructively to produce an optical output signal which varies in intensity in accordance with the rotation rate of the loop. Rotation sensing is commonly accomplished by detection of this optical output signal.

Various techniques have been devised to increase the sensitivity of fiber optic rotation sensors to small rotation velocities. However, these techniques do not work for very large rotation velocities because the output functions tend to repeat themselves at various velocities of rotation such that it cannot be determined from the output signal which of the possible rotation velocities which have the same output signal waveform is responsible for the particular output signal waveform observed.

The present invention provides a way to extend the dynamic range of the fiber optic gyroscope to larger rotational velocities.

SUMMARY OF THE INVENTION

The rotation sensor comprises all fiber optic components, such as a fiber optic directional coupler which (a) splits the light from the source into two waves that propagate around the sensing loop in opposite directions, and (b) combines the counter-propagating waves to provide an optical output signal. Proper polarization of the applied light, the counter-propagating waves, and the optical output signal is established, controlled, and maintained by a fiber optic polarizer and fiber optic polarization controllers. A second fiber optic coupler is provided to couple the optical output signal from the continuous strand to a photodetector which outputs an electrical signal that is proportional to the intensity of the optical signal.

Improved operating stability and sensitivity of the rotation sensor is achieved by phase modulating the counter-propagating waves at a first harmonic frequency using a first phase modulator and utilizing a synchronous or phase sensitive detection system to measure the first harmonic component of the optical output signal intensity. In the detection system disclosed, the amplitude of this first harmonic component is proportional to the rotation rate of the loop.

The improvements in the detection system which result in extended dynamic range include the use of a second phase modulator to phase modulate the counter-propagating light signals at another frequency which is the second harmonic of the first frequency and a feedback loop to control the amplitude of the second harmonic phase modulation. A feedback error signal is generated by a phase sensitive detector which comprises a photodetector and a lock-in amplifier. This feedback signal is proportional to the amplitude of the first harmonic component in the output signal from the photodetector. A feedback error correction modulator controls the amplitude of the second harmonic driving signal to the second phase modulator in accordance with the feedback error signal so as to cancel or limit the amplitude of the first harmonic component in the optical output signal caused by the Sagnac phase shift.

A further improvement comprises storing in a memory, rotation rate data related by a transfer function to the amplitude of the second harmonic phase modulation that cancels the first harmonic component in the optical output signal caused by rotation. The "cancellation" amplitude of the second harmonic that is sufficient to cancel or limit the first harmonic caused by the Sagnac effect is then converted to the rotation rate by accessing the memory using the amplitude of the cancellation signal as the address. The rotation rate data so accessed can then be used directly or converted into a signal which can be interpreted to derive the Sagnac phase shift or the velocity of rotation.

It has been found that amplitude modulation in odd harmonics of the optical output signal, caused by the phase modulator (either directly or indirectly, through polarization modulation), may be eliminated by operating the phase modulator at a specific frequency. Since the detection system utilized detects only an odd harmonic (e.g., the first harmonic), the effects of phase modulator induced amplitude modulation may be eliminated by operating at such frequency. This eliminates a significant source of error in rotation sensing, and thereby increases the accuracy of the rotation sensor.

BRIEF DESCRIPTION OF THE DRAWINGS

These and other advantages of the present invention are best understood with reference to the drawings in which.

DETAILED DESCRIPTION OF THE PREFERRED EMBODIMENT

Figure 1:
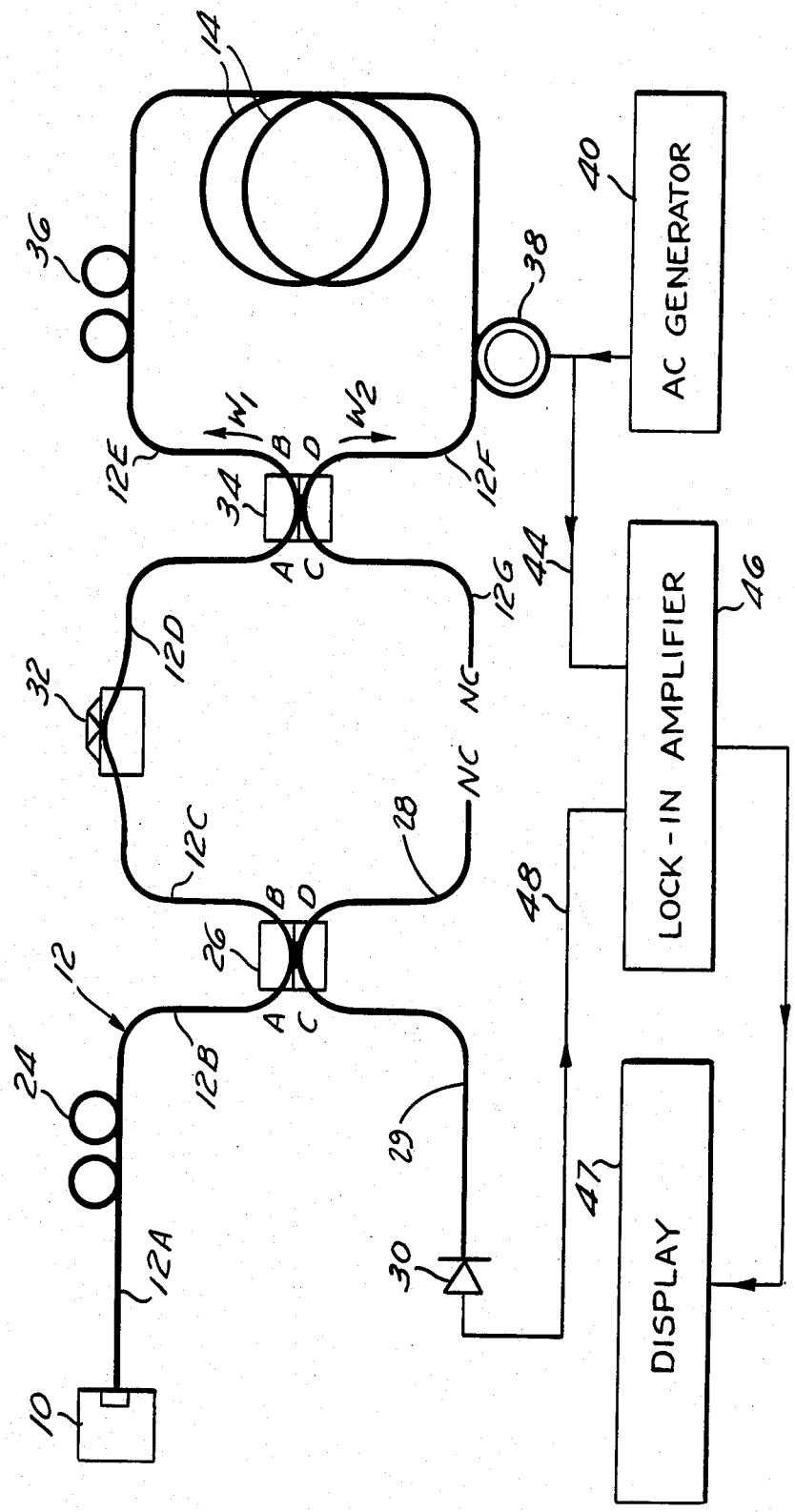
FIG. 1 is a schematic drawing of the basic rotation sensor used in the present invention showing the fiber optic components positioned along a continuous, uninterrupted strand of fiber optic material, and further showing the signal generator, photodetector, lock-in amplifier, and display associated with the detection system.

Before proceeding with a discussion of the preferred embodiment of the invention, a discussion of the basic rotation sensor used in the invention is necessary for fuller understanding of the improvement. FIG. 1 shows a rotation sensor such as is used in the present invention. It includes a light source 10 for introducing light into a continuous length or strand of optical fiber 12, a portion of which is wound into a sensing loop 14. As used herein, the reference numeral 12 designates generally the entire continuous strand of optical fiber, while the numeral 12 with letter suffixes (A, B, C, etc.) designates portions of the optical fiber 12.

In the embodiment shown, the light source 10 comprises a gallium arsenide (GaAs) laser which produces light having a wave length on the order of 0.82 microns. By way of specific example, the light source 10 may comprise a model GO-DIP laser diode, commercially available from General Optronics Corp., 3005 Hadley Road, South Plainfield, N.J. The fiber optic strands such as the strand 12 are preferably single mode fibers having, for example, an outer diameter of 80 microns and a core diameter of 4 microns. The loop 14 comprises a plurality of turns of the fiber 12 wrapped about a spool or other suitable support (not shown). By way of specific example, the loop 14 may have approximately 1000 turns of fiber wound on a form having a diameter of 14 centimeters.

Preferably, the loop 14 is wound symmetrically, starting from the center, so that symmetrical points in the loop 14 are in proximity. It is believed that this reduces the environmental sensitivity of the rotation sensor, since such symmetry causes time varying temperature and pressure gradients to have a similar effect on both of the counter-propagating waves.

Light from the source 10 is optically coupled to one end of the fiber 12 by butting the fiber 12 against the light source 10. Various components for guiding and processing the light are positioned or formed at various locations along the continuous strand 12. For the purpose of describing the relative locations of these components, the continuous fiber 12 will be described as being divided into seven portions, labeled 12A through 12G, respectively, with the portions 12A through 12E being on the side of the loop 14 that is coupled to the source 10, and the portions 12F and 12G being on the opposite side of the loop 14.

Adjacent to the light source 10, between the fiber portions 12A and 12B, is a polarization controller 24. A type of polarization controller suitable for use as the controller 24 is described in detail in co-pending patent application Ser. No. 183,975 filed Sept. 4, 1980, now issued as U.S. Pat. No. 4,389,090, entitled "Fiber Optic Polarization Controller", assigned to the assignee of the present invention, and is hereby incorporated by reference. A brief description of the polarization controllers 24 will be provided subsequently. However, it should be presently understood that this controller 24 permits adjustment of both the state and direction of polarization of the applied light.

The fiber 12 then passes through ports labeled A and B of a directional coupler 26, located between the fiber portions 12B and 12C. The coupler 26 couples optical power to a second strand of optical fiber which passes through the ports labeled C and D of the coupler 26, the port C being on the same side of the coupler as the port A, and the port D being on the same side of the coupler as the port B. The end of the fiber 28 extending from the port D terminates non-reflectively at the point labeled "NC" (for "not connected") while the end of the fiber 29 extending from the port C is optically coupled to a photodetector 30. By way of specific example, the photodetector 30 may comprise a standard, reverse biased, silicon, PIN-type, photo diode. The coupler 26 is described in detail in co-pending patent application Ser. No. 300,955, filed Sept. 10, 1981, now issued as U.S. Pat. No. 4,536,058, entitled "Method of Manufacturing a Fiber Optic Directional Coupler" which is a continuation-in-part of patent application Ser. No. 139,511, filed Apr. 11, 1980, entitled "Fiber Optic Directional Coupler", both of said patent applications and patents issued thereon being assigned to the assignee of the present invention. These copending patent applications and issued patents are hereby incorporated by reference.

The fiber portion 12C extending from port B of the coupler 26 passes through a polarizer 32, located between the fiber portions 12C and 12D. A monomode optical fiber has two polarization modes of travel for any light wave. The polarizer 32 permits passage of light in one of the polarization modes of the fiber 12, while preventing passage of light in the other polarization mode. Preferably, the polarization controller 24 mentioned above is used to adjust the polarization of the applied light so that such polarization is substantially the same as the polarization mode passed by the polarizer 32. This reduces the loss of optical power as the applied light propagates through the polarizer. A preferred type of polarizer for use in the present invention is described in detail in co-pending patent application Ser. No. 195,934, filed Oct. 10, 1980, now issued as U.S. Pat. No. 4,386,822, entitled "Polarizer and Method", assigned to the assignee of the present invention, and is hereby incorporated by reference.

After passing through the polarizer 32, the fiber 12 passes through ports labeled A and B of a directional coupler 34, located between the fiber portions 12D and 12E. This coupler 34 is preferably of the same type as described above in reference to the coupler 26. The fiber 12 is then wound into the loop 14, with a polarization controller 36 located between the loop 14 and fiber portion 12E. This polarization controller 36 may be of the type discussed in reference to the controller 24, and is utilized to adjust the polarization of the light waves counter-propagating through the loop 14 so that the optical output signal, formed by interference of these counter-propagating waves, has a polarization which will be efficiently passed by the polarizer 32 with minimal optical power loss. Thus, by utilizing both the polarization controllers 24 and 36, the polarization of the light propagating through the fiber 12 may be adjusted for maximum optical power output.

A phase modulator 38 driven by an AC signal generator 40 is mounted in the fiber segment 12F between the loop 14 and the second directional coupler 34. This modulator 38 comprises a PZT cylinder, around which the fiber 12 is wrapped. The fiber 12 is bonded to the cylinder so that when it expands radially in response to the modulating signal from the generator 40, it stretches the fiber 12. An alternative type of modulator (not shown), suitable for use with the present invention, comprises a PZT cylinder which longitudinally stretches four segments of the fiber 12 bonded to short lengths of capillary tubing at the ends of the cylinder. Those skilled in the art will recognize that this alternative type of modulator may impart a lesser degree of polarization modulation to the propagating optical signal than the modulator 38; however, it will be seen subsequently that the modulator 38 may be operated at a frequency which eliminates the undesirable effects of polarization modulation. Thus, either type of modulator is suitable for use in the present invention.

The fiber 12 then passes through ports labeled C and D of the coupler 34, with the fiber portion 12F extending from the port D and the fiber portion 12G extending from the port C. Fiber portion 12G terminates non-reflectively at a point labeled "NC" (for "not connected"). The output signal from the AC generator 40 is supplied on a line 44 to a lock-in amplifier 46 as a reference signal, which lock-in amplifier 46 also is connected to receive the output of the photodetector 30 by a line 48. This signal on the line 44 to the amplifier 46 provides a reference signal for enabling the amplifier 46 to synchronously detect the detector output signal at the modulation frequency, i.e., the first harmonic component of the optical output signal, of the modulator 38 while blocking all other harmonics of this frequency.

Lock-in amplifiers are well known in the art and are commercially available.

It will be seen below that the magnitude of the first harmonic component of the detector output signal is proportional through a certain limited operating range to the rotation rate of the loop 14. The amplifier 46 outputs a signal which is proportional to this first harmonic component, and thus provides a direct indication of the rotation rate, which may be visually displayed on a display panel 47. However, the scheme of detection shown in FIG. 1 can only be used for relatively small rotation rates as will be seen in connection with the discussion of FIG. 9.

The Couplers 26 and 34

Figure 2:
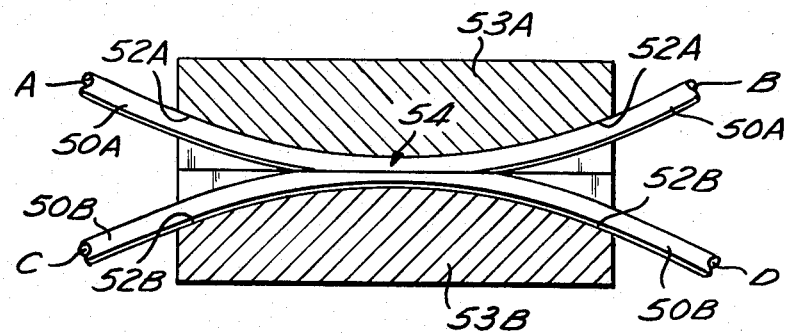
FIG. 2 is a sectional view of one embodiment of a fiber optic directional coupler for use in the rotation sensor of FIG. 1.

A preferred fiber optic directional coupler for use as the couplers 26 and 34 in the rotation sensor or gyroscope of the present invention is illustrated in FIG. 2. The coupler comprises two optical fiber strands labeled 50A, 50B in FIG. 2, of a single mode fiber optic material having a portion of the cladding removed from one side thereof. The two strands 50A and 50B are mounted in respective arcuate slots 52A and 52B, formed in respective blocks 53A and 53B. The strands 50A and 50B are positioned with the portions of the strands where the cladding has been removed in close spaced relationship, to form a region of interaction 54 in which the light is transferred between the core portions of the strands. The amount of material removed is such that the core portion of each strand 50A and 50B is within the evanescent field of the other. The center-to-center spacing between the strands at the center of the coupler is typically less than about 2–3 core diameters.

It is important to note that the light transferred between the strands at the region of interaction 54 is directional. That is, substantially all of the light applied to input port A is delivered to the output ports B and D, without contra-directional coupling to port C. Likewise, substantially all of the light applied to input port C is delivered to the output ports B and D. Further, this directivity is symmetrical. Thus, light supplied to either input port B or input port D is delivered to the output ports A and C. Moreover, the coupler is essentially non-discriminatory with respect to polarizations, and thus preserves the polarization of the coupled light. Thus, for example, if a light beam having a vertical polarization is input to port A, the light coupled from port A to port D, as well as the light passing straight through from port A to port B, will remain vertically polarized.

From the foregoing, it can be seen that the coupler may function as a beam-splitter to divide the applied light into two counter-propagating waves W1, W2 (FIG. 1). Further, the coupler may additionally function to recombine the counter-propagating waves after they have traversed the loop 14 (FIG. 1).

In the embodiment shown, each of the couplers 26, 34 has a coupling efficiency of fifty percent, as this choice of coupling efficiency provides maximum optical power at the photodetector 30 (FIG. 1). As used herein, the term "coupling efficiency" is defined as the power ratio of the coupled power to the total output power, expressed as a percent. For example, referring to FIG. 2, if light is applied to port A, the coupling efficiency would be equal to the ratio of the power at port D to the sum of the power output at ports B and D. Further, a coupling efficiency of 50% for the coupler 34 insures that the counter-propagating waves W1, W2 are of equal magnitude.

The Polarizer 32

Figure 3:
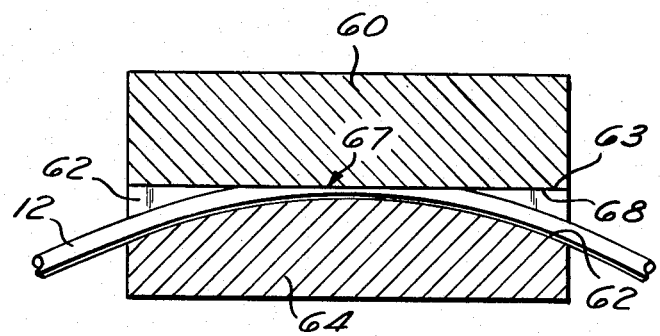
FIG. 3 is a sectional view of one embodiment of a fiber optic polarizer for use in the rotation sensor of FIG. 1.

A preferred polarizer for use in the rotation sensor of FIG. 1 is illustrated in FIG. 3. This polarizer includes a birefringent crystal 60, positioned within the evanescent field of light transmitted by the fiber 12. The fiber 12 is mounted in a slot 62 which opens to the upper face 63 of a generally rectangular quartz block 64. The slot 62 has an arcuately curved bottom wall, and the fiber is mounted in the slot 62 so that it follows the contour of this bottom wall. The upper surface 63 of the block 64 is lapped to remove a portion of the cladding from the fiber 12 in a region 67. The crystal 60 is mounted on the block 64, with the lower surface 68 of the crystal facing the upper surface 63 of the block 64, to position the crystal 60 within the evanescent field of the fiber 12.

The relative indices of refraction of the fiber 12 and the birefringent material 60 are selected so that the wave velocity of the desired polarization mode is greater in the birefringent crystal 60 than in the fiber 12, while the wave velocity of an undesired polarization mode is greater in the fiber 12 than in the birefringent crystal 60. The light of the desired polarization mode remains guided by the core portion of the fiber 12, whereas light of the undesired polarization mode is coupled from the fiber 12 to the birefringent crystal 60. Thus, the polarizer 32 permits passage of light in one polarization mode, while preventing passage of light in the other polarization mode. As previously indicated, the polarization controllers 24, 36 (FIG. 1) may be utilized to adjust the polarizations of the applied light and optical output signal, respectively, so that optical power loss through the polarizer is minimized.

The Polarization Controllers 24, 36

Figure 4:
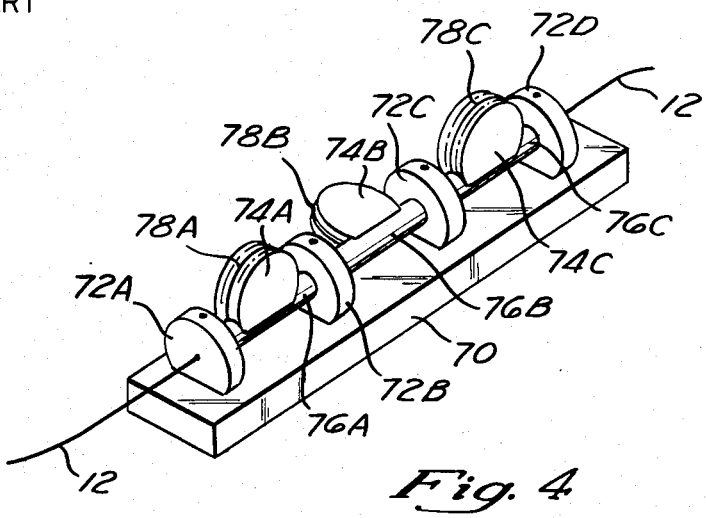
FIG. 4 is a perspective view of one embodiment of a fiber optic polarization controller for use in the rotation sensor of FIG. 1.

One type of polarization controller suitable for use in the rotation sensor of FIG. 1 is illustrated in FIG. 4. The controller includes a base 70 on which a plurality of upright blocks 72A through 72D are mounted. Between adjacent ones of the blocks 72, spools 74A through 74C are tangentially mounted on shafts 76A through 76C, respectively. The shafts 76 are axially aligned with each other, and are rotatably mounted between the blocks 72. The spools 74 are generally cylindrical and are positioned tangentially to the shafts 76. The strand 12 extends through axial bores in the shafts 76 and is wrapped about each of the spools 74 to form three coils 78A through 78C. The radii of the coil 78 are such that the fiber 12 is stressed to form a birefringent medium in each of the coils 78. The three coils 78A through 78C may be rotated independently of each other about the axis of the shafts 74A through 74C respectively to adjust the birefringence of the fiber 12 and, thus, to control the polarization of the light passing through the fiber 12.

The diameter and number of turns in the coils 78 are such that the outer coils 78A and C provide a spatial delay of one-quarter wave length, while the central coil 78D provides a spatial delay of one-half wave length. The quarter wave length coils 78A and C control the elipticity of the polarization, and the half wave length coil 78 controls the direction of polarization. This provides a full range of adjustment of the polarization of the light propagating through the fiber 12. It will be understood, however, that the polarization controller may be modified to provide only the two quarter wave coils 78A and C, since the direction of polarization (otherwise provided by the central coil 78B) may be controlled indirectly through proper adjustment of the elipticity of polarization by means of the two quarter wave coils 78A and C. Accordingly, the polarization controllers 24 and 36 are shown in FIG. 1 as including only the two quarter wave coils 78A and C. Since this configuration reduces the overall size of the controllers 24-36, it may be advantageous for certain applications of the present invention involving space limitations.

Thus, the polarization controllers 24 and 36 provide means for establishing, maintaining and controlling the polarization of both the applied light and the counter-propagating waves.

Operation Without Phase Modulation Or Polarization Control

Figure 5:
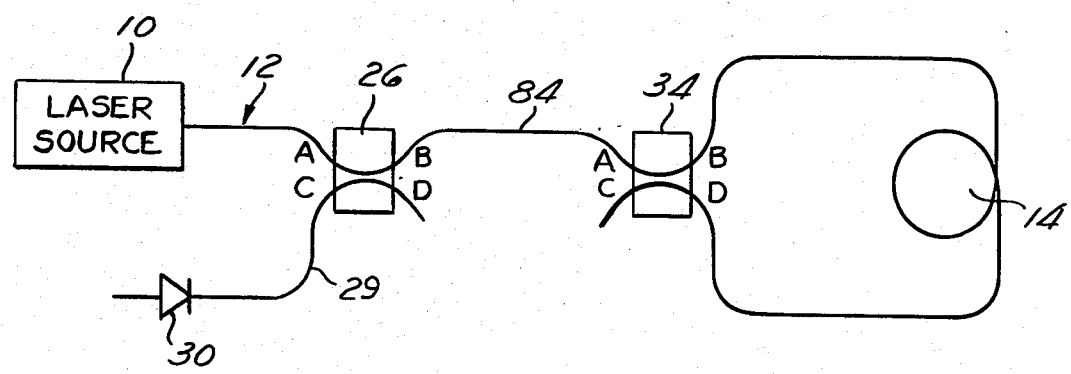
FIG. 5 is a schematic diagram of the rotation sensor of FIG. 1 with the polarizer, polarization controllers, and phase modulator removed therefrom.

In order to fully understand the function and importance of the polarizer 32 (FIG. 1) and phase modulator 38, the operation of the rotation sensor will first be described as if these components had been removed from the system. Accordingly FIG. 5 shows the rotation sensor of FIG. 1 in schematic block diagram form, with the modulator 38, polarizer 32, and associated components removed therefrom.

Light is coupled from the laser source 10 to the fiber 12 for propagation therein. The light enters port A of the coupler 26, where a portion of the light is lost through port D. The remaining portion of the light propagates from port B to port A of the coupler 34, where it is split into two counter-propagating waves W1, W2 of equal amplitude. The wave W1 propagates from the port B in a clockwise direction about the loop 14, while the wave W2 propagates from port D in a counter-clockwise direction around the loop 14. After the waves W1, W2 have traversed the loop 14, they are recombined by the coupler 34 to form an optical output signal, which propagates from port A of the coupler 34 to port B of the coupler 26. A portion of the optical output signal is coupled from port B to port C of the coupler 26 for propagation along the fiber 29 to the photodetector 30. This photodetector 30 outputs an electrical signal which is proportional to the intensity of the light impressed thereon by the optical output signal.

The intensity of the optical output signal will vary in accordance with the amount and type, i.e., constructive or destructive, of interference between the waves W1, W2 when they are recombined or interferred at the coupler 34. Ignoring, for the moment, the effects of fiber birefringence, the waves W1, W2 travel the same optical path around the loop 14. Thus, assuming the loop 14 is at rest, when the waves W1, W2 are recombined at the coupler 34, they will interfere constructively, with no phase difference therebetween, and the intensity of the optical output signal will be at a maximum. However, when the loop 14 is rotated, the counter-propagating waves W1, W2, will be shifted in phase in accordance with the Sagnac effect, so that when they are superposed at the coupler 34, they destructively interfere to reduce the intensity of the optical output signal. Such Sagnac phase difference between the waves W1, W2, caused by rotation of the loop 14, is defined by the following relationship:

$$\Delta\phi_R = \frac{8\pi NA}{\lambda c} \Omega \qquad (1)$$

where:

A is the area bounded by the loop 14 of optical fiber;
N is the number of turns of the optical fiber about the area A;
$\Omega$ is the angular velocity of the loop about an axis which is perpendicular to the plane of the loop; and
$\lambda$ and c are the free space values of the wave length and velocity, respectively, of the light applied to the loop.

The intensity of the optical output signal ($I_T$) is a function of the Sagnac phase difference ($\Delta\phi_R$) between the waves W1, W2, and is defined by the following equation:

$$I_T = I_1 + I_2 + 2\sqrt{I_1 I_2} \cos(\Delta\phi_R) \qquad (2)$$

where $I_1$ and $I_2$ are the individual intensities of the waves W1, W2, respectively.

From equations (1) and (2) it may be seen that the intensity of optical output signal is a function of the rotation rate ($\Omega$). Thus, an indication of such rotation rate may be obtained by measuring the intensity of the optical output signal, utilizing the detector 30.

Figure 6:
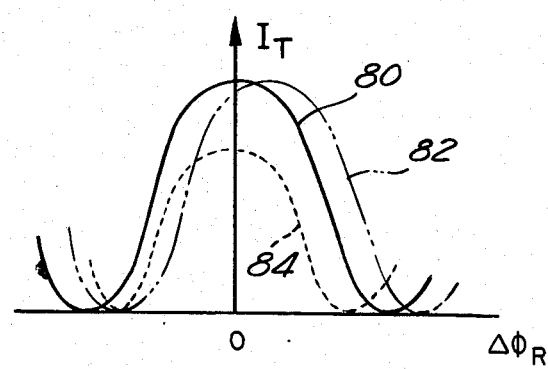
FIG. 6 is a graph of the intensity of the optical output signal, as measured by the photodetector, as a function of the rotationally induced Sagnac phase difference, illustrating the effects of birefringence induced phase differences and birefringence induced amplitude fluctuations.

FIG. 6 shows a curve 80, which illustrates this relationship between the intensity of the optical output signal ($I_T$) and the Sagnac phase difference ($\Delta\phi_R$) between the counter-propagating waves W1, W2. The curve 80 has the shape of a cosine curve, and the intensity of the optical output signal is at a maximum when the Sagnac phase difference is zero. Where the phase difference between the counter-propagating waves W1, W2 is caused entirely by rotation of the loop 14, the curve 80 will vary symmetrically about the vertical axis. However, as discussed in copending patent application Ser. No. 288,212, filed July 29, 1981, now issued as U.S. Pat. No. 4,529,312 with polarized light an additional, non-reciprocal, phase difference between the counter-propagating waves W1, W2 may be caused by the residual birefringence of the optical fiber 12. This application and patent issued thereon are hereby incorporated by reference. This additional non-reciprocal phase difference will not occur if completely unpolarized light is used. Birefringence induced phase differences occur because light traveling in each of the two polarization modes of the single mode fiber 12 travels at a different velocity. Birefringence will cause coupling of part of the light traveling in one polarization mode into the other mode. This creates a non-rotationally induced phase difference between the waves W1, W2, which causes the waves W1, W2 to interfere in a manner that distorts or shifts the curve 80 of FIG. 6. Such a shift is illustrated by the curve 82, shown in phantom lines in FIG. 6. Such birefringence induced, non-reciprocal phase difference in indistinguishable from a rotationally induced Sagnac phase difference, and is dependent on environmental factors which vary fiber birefringence, such as temperature and pressure. Thus, fiber birefringence is the cause of a major source of error in fiber optic rotation sensors.

Operation With the Polarizer 32

The problem of non-reciprocal operation due to fiber birefringence is solved in the rotation sensor of the present invention by means of the polarizer 32 (FIG. 1) which, as discussed above, permits utilization of only a single polarization mode. When the polarizer 32 is introduced into the system at the point designated by the reference numeral 84 in FIG. 5, light passing through the polarizer 32 propagates into the loop 14 in one selected polarization mode. Further, when the counter-propagating waves are recombined to form the optical output signal, any light that is not of the same polarization as the light applied to the loop is prevented from reaching the photodetector 30, since the optical output signal passes through the polarizer 32. Thus, the optical output signal, as it travels from port A of coupler 34 to port B of coupler 26, will have precisely the same polarization as the light applied to the loop.

Therefore, by passing the input light and optical output signal through the same polarizer 32, only a single optical path is utilized, thereby eliminating the problem of birefringence induced phase difference caused by the different velocities of propagation in the two possible polarization modes. That is, by filtering out all light which is transferred from the selected mode to the unselected mode by the birefringence in the fiber, it is possible to eliminate all light waves in he unselected mode which might gain or lose phase relative to the selected mode because of the different velocity of propagation. Further, it should be noted that the polarization controllers 24, 36 (FIG. 1) may be used to adjust the polarization of the applied light, and optical output signal, respectively, to reduce optical power loss at the polarizer 32, and thus, maximize the signal intensity at the detector 30.

Operation With the Phase Modulator 38

Referring again to FIG. 6, it will be seen that, because the curve 80 is a cosine function, the intensity of the optical output signal is nonlinear for small Sagnac phase differences ($\Delta\phi_R$) between the waves W1, W2. Further, the optical output signal intensity is relatively insensitive to changes in phase difference, for small values of $\Delta\phi_R$ Such nonlinearity and insensitivity makes it difficult to transform the optical intensity ($I_T$) measured by detector 30 into a signal indicative of the rate of rotation of the loop 14 (via equation 1).

Further, although birefringence induced phase differences between the waves W1, W2 are eliminated, as discussed above by use of the polarizer 32, nevertheless cross coupling between polarization modes caused by fiber birefringence occurs. This cross coupling reduces the optical intensity of the optical output signal since the cross coupled light is prevented from reaching the photodetector 30 by the polarizer 32. Thus, changes in fiber birefringence cause the amplitude of the curve 80 of FIG. 6 to vary, for example, as illustrated by the curve 84. It will be understood that curves 80, 82, 84 of FIG. 6 are not drawn to scale.

The foregoing problems are solved by means of a synchronous detection system utilizing the phase modulator 38, signal generator 40 and lock-in amplifier 46 shown in FIG. 1.

Figure 7:
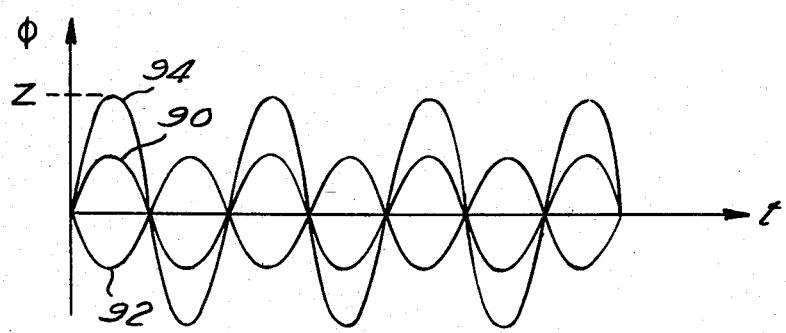
FIG. 7 is a graph of phase difference as a function of time showing the phase modulation of each of the counter-propagating waves and the phase difference between the counter-propagating waves.

Referring to FIG. 7, the phase modulator 38 modulates the phase of each of the propagating waves W1, W2 at the frequency of the signal generator 40. However, as may be seen from FIG. 1, the phase modulator 38 is located at one end of the loop 14. Thus, the modulation of the wave W1 is not necessarily in phase with the modulation of the wave W2. Indeed, it is preferable for proper operation of this synchronous detection system that the modulation of the waves W1, W2 be 180° out of phase. Referring to FIG. 7, it is preferable that the modulation of the wave W1, represented by the sinusoidal curve 90, be 180° out of phase with the modulation of the wave W2, represented by the curve 92. Use of a modulation frequency which provides such 180° phase difference between the modulation of the wave W1 relative to that of W2 is particularly advantageous in that it eliminates modulator induced amplitude modulation in the optical output signal measured by the detector 30. This modulation frequency ($f_m$) may be calculated using the following equation:

$$f_m = \frac{c}{2n_{eq}L} \quad (3)$$

where:

L is the differential fiber length between the coupler 34 and the modulator 38 for the counter-propagating waves W1, W2, i.e., the distance, measured along the fiber, between the modulator 38 and a symmetrical point on the other side of the loop 14;

$n_{eq}$ is the equivalent refractive index for the single mode fiber 12; and c is the free space velocity of the light applied to the loop 14.

At this modulation frequency ($f_m$) which is called the "proper" frequency, the phase difference ($\Delta\phi_1$) between the counter-propagating waves W1, W2, stemming from phase modulation of these waves in accordance with the curves 90 and 92, is illustrated by the sinusoidal curve 94 in FIG. 7. The curve 94 is obtained by subtracting the curve 92 from the curve 90 to obtain the phase difference between W1 and W2. This modulation of the phase difference between the waves W1, W2 will also modulate the intensity ($I_T$) of the optical output signal in accordance with the curve 80 of FIG. 6 just as a Sagnac phase shift would, since such phase modulation $\Delta\phi_1$ is indistinguishable from rotationally induced Sagnac phase differences $\Delta\phi_R$.

Figure 8:
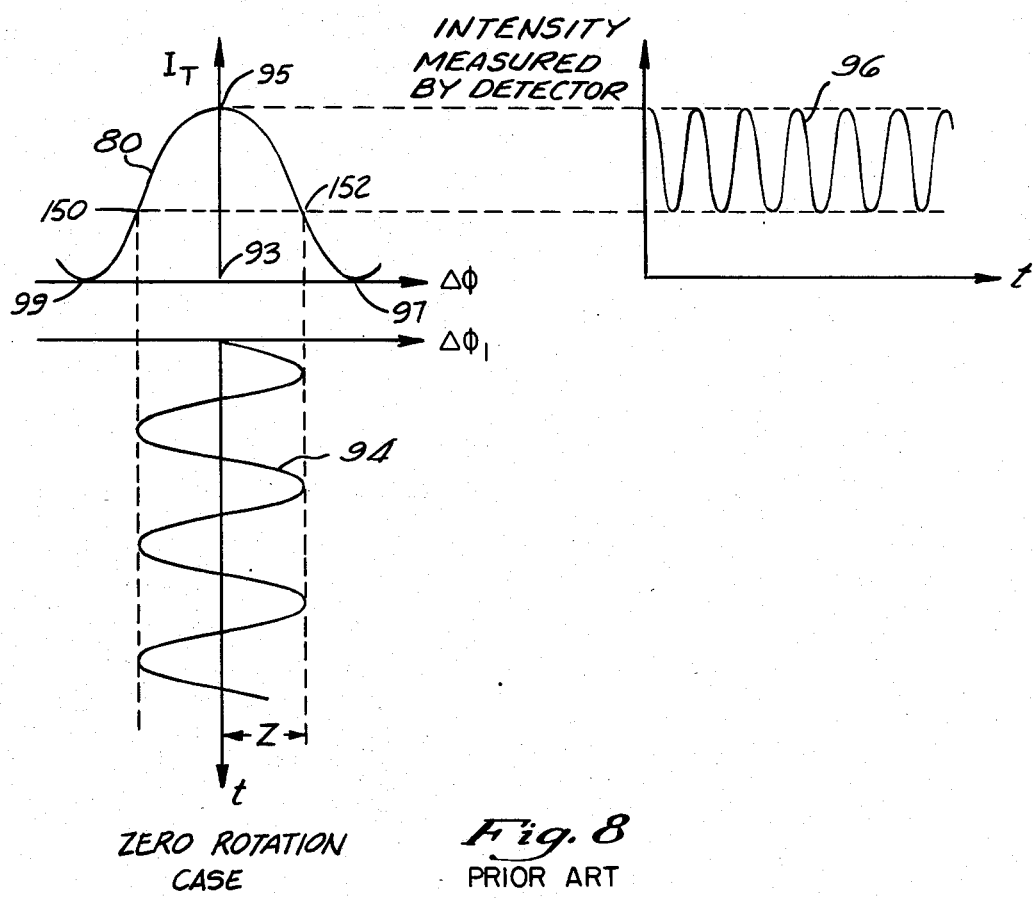
FIG. 8 is a schematic drawing illustrating the effect of the phase modulation upon the intensity of the optical output signal, as measured by the detector, when the loop is at rest.
Figure 9:
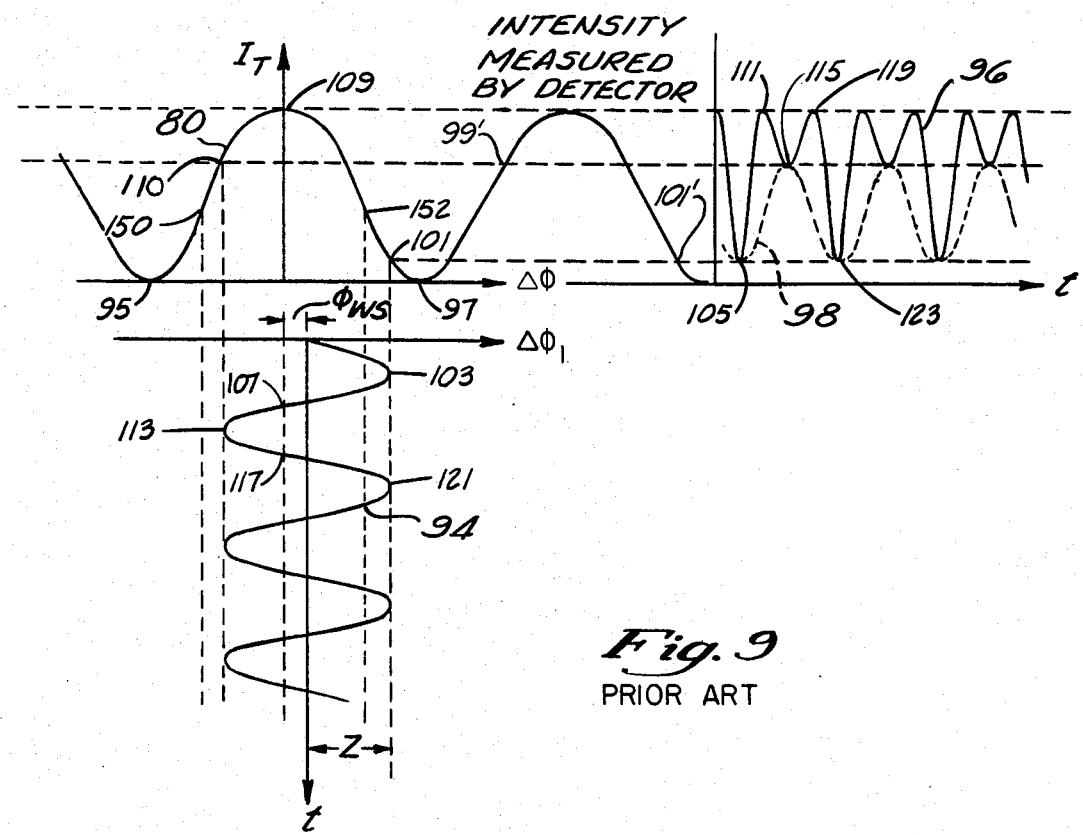
FIG. 9 is a schematic drawing showing the effect of the phase modulation upon the intensity of the optical output signal as measured by the detector when the loop is rotating.

The foregoing may be understood more fully through reference to FIGS. 8 and 9 which graphically illustrate the effect of (a) the phase modulation $\Delta\phi_1$, defined by the curve 94 of FIG. 7, and (b) the Sagnac phase difference $\Delta\phi_R$, upon the intensity ($I_T$) of the optical output signal. Before proceeding with a discussion of FIGS. 8 and 9, it should first be understood that the intensity ($I_T$) of the modulated optical output signal is a function of the total phase difference between the waves W1, W2. Such total phase difference is comprised of both the rotationally induced Sagnac phase difference $\Delta\phi_R$ and the time varying modulation induced phase difference $\Delta\phi_1$. The total phase difference $\Delta\phi$ between the waves W1, W2 may be expressed as follows:

$$\Delta\phi = \Delta\phi_R + \Delta\phi_1 \quad (4)$$

Accordingly, since the effects of the modulation induced phase difference $\Delta\phi_1$, as well as the rotationally induced phase difference $\Delta\phi_R$ will be considered in reference to FIGS. 8 and 9, the horizontal axis for the curve 80 has been relabeled as $\Delta\phi$ to indicate that the total phase difference is being considered, rather than only the rotationally induced phase difference, as in FIG. 6.

Referring now to FIG. 8, the effect of the phase modulation $\Delta\phi_1$ (curve 94) upon the intensity $I_T$ of the optical output signal will be discussed. Curve 80 represents the relationship between the intensity of the optical output signal resulting from two interfering coherent waves to the phase difference $\Delta\phi$ between the waves. When the relative phase angle between them is zero, as illustrated at 93, the resultant intensity of the combined wave is a maximum, as illustrated at 95. When the relative phase between the waves W1 and W2 is non-zero, the combined optical signal will have a lower intensity depending upon the magnitude of the phase difference $\Delta\phi$. The intensity continues to decrease with increasing $\Delta\phi$ until the relative phase difference is either plus or minus 180°, as illustrated at 97 and 99 respectively. At a phase difference of plus or minus 180°, the two counter-propagating waves completely destructively interfere, and the resultant intensity is zero as illustrated at 97 and 99.

In FIG. 8, it is assumed that the loop 14 is at rest, and thus, the optical signal is not affected by the Sagnac effect. Specifically, it may be seen that the modulation induced phase difference curve 94 causes the optical output signal to vary as illustrated by the curve 96. The curve 96 is obtained by translating the points on the curve 94, representing the instantaneous phase difference $\Delta\phi_1$ between W1 and W2 onto the curve 80 representing the resultant optical intensity for a phase difference of that magnitude. When all the points on the curve 94 are translated onto the curve 80, and the corresponding intensities are plotted, the curve 96 results. The translation of the curve 94 through the curve 80 is symmetrical about the vertical axis of the curve 80, so that the optical intensity measured by the detector 30 varies periodically at a frequency equal to the second harmonic of the modulating frequency, as shown by the curve 96. Since, as discussed above, the lock-in amplifier 46 is tuned by the reference signal at the modulation frequency $f_m$ from the signal generator 40 (FIG. 1), the lock-in amplifier synchronously detects only the detector output signal at the modulation frequency $f_m$, i.e., first harmonic, of the modulator 38. But since the detector output signal is at the second harmonic of the modulation frequency, as shown by the curve 96, the output signal from the amplifier 46 will be zero and the display 47 will indicate a rotation rate of zero.

It should be noted that even if birefringence induced amplitude fluctuations occur in the optical output signal, as discussed in reference to the curve 84 of FIG. 6, the curve 96 of FIG. 8 will remain at a second harmonic frequency. Thus, such birefringence induced amplitude fluctuations will not affect the amplifier 46 output signal. The detection system thus far described therefore provides a substantially more stable operating point that is insensitive to changes in birefringence.

When the loop 14 is rotated, the counter-propagating waves W1, W2 are shifted in phase, as discussed above, in accordance with the Sagnac effect. The Sagnac phase shift provides a constant phase difference $\Delta\phi_R$ for a constant rotational velocity. This Sagnac phase shift adds to the phase difference $\Delta\phi_1$ created by the modulator 38, so that the entire curve 94 is translated in phase from the position shown in FIG. 8, by an amount equal to $\Delta\phi_R$, as shown in FIG. 9. This causes the optical output signal to vary nonsymmetrically along the curve 80 between the points 110 and 101. This causes an optical output signal as illustrated by curve 96.

The points on the curve 96 are derived as follows. The combined phase difference, illustrated at 103 on curve 94, translates through the point 101 on the curve 80 to the point 105 on the curve 96. The point 107 on the curve 94 translates through the point 109 on the curve 80 to a point 111 on the curve 96. Likewise, the point 113 translates through the point 110 to the point 115, and the point 117 translates through the point 109 to the point 119. Finally, the point 121 translates through the point 101 to the point 123.

The optical output signal 96 has a first harmonic component as illustrated in phantom lines of the sinusoidal curve 98. The peak amplitude of the first harmonic component 98 need not, however, exactly match the amplitude of the optical output signal at point 115 although it might in some cases.

It will be seen subsequently that the RMS value of this sinusoidal curve 98 is proportional to the sine of the rotationally induced Sagnac phase difference $\Delta\phi_R$. Since the amplifier 46 synchronously detects signals having the fundamental frequency of the modulator 38, the amplifier 46 will output a signal that is proportional to the RMS value of the curve 98. This signal can be used to indicate the rotation rate of the loop.

The drawings of FIG. 9 illustrate the intensity wave form of the optical output signal for one direction of rotation (e.g., clockwise) of the loop 14. However, it will be understood that, if the loop 14 is rotated in the opposite direction (e.g., counter-clockwise) at an equal velocity, the intensity wave form 96 of the optical output signal will be exactly the same as illustrated in FIG. 9, except that it will be translated so that the curve 98 is shifted 180° from the position shown in FIG. 9. The lock-in amplifier 46 detects this 180° phase difference for the curve 98, by comparing the phase of the first harmonic 98 with the phase of the reference signal from the signal generator 40, to determine whether the rotation of the loop is clockwise or counter-clockwise. Depending on the direction of rotation, the amplifier 46 outputs either a positive or negative signal to the display 47. However, regardless of the direction of rotation, the magnitude of the signal is the same for equal rates of rotation of the loop 14.

Figure 10:
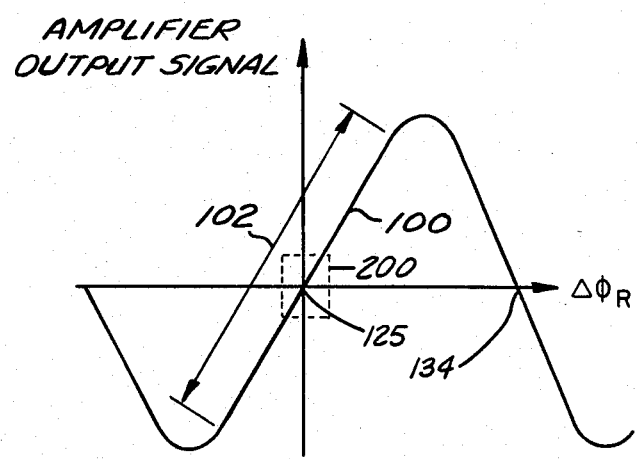
FIG. 10 is a graph of the amplifier output signal as a function of the rotationally induced Sagnac phase difference, illustrating an operating range for the rotation sensor of FIG. 1.

The waveform of the amplifier output signal is shown in FIG. 10 as the curve 100. If will be seen that this curve 100 is sinusoidal and varies positively or negatively from the zero rotation rate output voltage, illustrated at 125, depending on whether the rotation of the loop 14 is clockwise or counter-clockwise. Further, the curve 100 has a substantially linear portion 102 which varies symmetrically about the origin and provides a relatively wide operating range for measuring rotation. Moreover, the slope of the curve 100 provides excellent sensitivity through its linear operating range 102 to small Sagnac phase shifts.

Thus, by utilizing the synchronous detection system, the above-described problems of nonlinearity, insensitivity to small Sagnac phase shifts, and birefringence induced amplitude fluctuations are reduced or eliminated for rotation rates of the loop 14 which keep the points 110 and 101 in FIG. 9 somewhere on the curve 80 between the points 97 and 95.

A further advantage of the detection system thus far disclosed relates to the fact that state of the art phase modulators, such as the modulator 38, induce amplitude modulation in the optical output signal, either directly or indirectly, through polarization modulation, i.e., the phase modulator also shifts some of the light passing therethrough to the unselected polarization mode. However, it will be recalled from the discussion in reference to Equation (3) that, by operating at a specific or "proper" frequency at which the phase difference between the modulation of the waves W1 and W2 is 180°, the odd harmonic frequency components of this amplitude modulation, that are induced in each of the counter-propagating waves W1, W2 by the modulator 38, cancel each other when the waves are superposed to form the optical output signal. Thus, since the above-described detection system detects only an odd harmonic, i.e., the fundamental frequency, of the optical output signal, the effects of the undesired amplitude modulation are eliminated. Therefore, by operating at the specific frequency defined by Equation (3), and by detecting only an odd harmonic of the optical output signal, the rotation sensor of the present invention may operate independently of modulator induced amplitude and polarization modulation.

A further benefit of operating at the proper frequency is that even harmonics of the phase modulation, induced by the modulator 38 in each of the counter-propagating phase W1, W2, cancel when these waves are superposed to form the optical output signal. Since these even harmonics may, by superposition, produce spurious odd harmonics in the optical signal which might otherwise be detected by the detection system, their elimination improves the accuracy of rotation sensing.

In addition to operating the phase modulator 38 at the frequency defined by Equation (3), it is also preferable to adjust the magnitude of the phase modulation so that the amplitude of the detected first harmonic of the optical output signal intensity is maximized, since this provides improved rotation sensing sensitivity and accuracy. It has been found that the first harmonic of the optical output signal intensity is at the maximum, for a given rotation rate, when the amplitude of the modulator induced phase difference $\Delta\phi_1$ between the waves W1, W2, indicated by the dimension labeled Z in FIGS. 7, 8, and 9, is 1.84 radians. This may be understood more fully through reference to the following equation for the total intensity ($I_T$) of two superposed waves having individual intensities of $I_1$ and $I_2$, respectively, with a phase difference $\Delta\phi$ therebetween.

$$I_T = I_1 + I_2 + 2\sqrt{I_1 I_2} \cos(\Delta\phi) \tag{5}$$

where:

$$\Delta\phi = \Delta\phi_R + \Delta\phi_1 \tag{6}$$

and $$\Delta\phi_1 = Z \sin(2\pi f_m t). \tag{7}$$

Thus, $$\Delta\phi = \Delta\Phi_R + Z \sin(2\pi f_m t) \tag{8}$$

The Fourier expansion of cosine ($\Delta\phi$) is:

$$\cos(\Delta\phi) = \tag{9}$$

$$\cos(\Delta\phi_R)\left\{ J_0(z) + 2 \sum_{n=1}^{\infty} J_{2n}(z)\cos[2\pi(2nf_m t)] \right\} -$$

$$\sin(\Delta\phi_R)\left\{ 2 \sum_{n=1}^{\infty} J_{2n-1}(z)\sin[2\pi(2n-1)f_m t] \right\}$$

where $J_n(z)$ is the $n^{th}$ Bessel function of the variable z, and z is the peak amplitude of the modulator induced phase difference between the waves W1, W2.

Therefore, detecting only the first harmonic of $I_T$ yields:

$$I_{T(1)} = 4\sqrt{I_1 I_2} J_1(z) \sin(\Delta\phi_R) \sin(2\pi f_m t) \tag{10}$$

Thus, the amplitude of the first harmonic of the optical output signal intensity is dependent upon the value of the first Bessel function $J_1(z)$. Since $J_1(z)$ is a maximum when z equals 1.84 radians, the amplitude of the phase modulation should preferably be selected so that the magnitude (z) of the modulator induced phase difference $\Delta\phi_1$ between the waves W1, W2 is 1.84 radians.

Reducing the Effects of Backscatter

As is well known, present state-of-the-art optical fibers are not optically perfect, but have imperfections such as density fluctuations in the basic material of the fiber. These imperfections cause variations in the refractive index of the fiber which causes scattering of small amounts of light. This phenomena is commonly referred to as Rayleigh scattering. Although such scattering causes some light to be lost from the fiber, the amount of such loss is relatively small, and therefore, is not a major concern. The principal problem associated with Rayleigh scattering relates not to scattered light which is lost, but rather to light which is reflected so that it propagates through the fiber in a direction opposite to its original direction of propagation. This is commonly referred to as "backscattered" light. Since such backscattered light is coherent with the light comprising the counter-propagating waves W1, W2, it can constructively or destructively interfere with such propagating waves, and thereby cause variation in the intensity of the optical output signal, as measured by the detector 30.

The portion of backscattered light from one wave which will be coherent with the counter-propagating wave is that which is scattered within a coherence length of the center of the loop 14. Thus, by reducing the coherence length of the source, the coherence between the backscattered light and the counter-propagating waves is reduced. The remaining portion of the backscattered light will be incoherent with the counter-propagating wave, and thus, the interference therebetween will vary randomly so that it is averaged. Therefore, this incoherent portion of the backscattered light will be of substantially constant intensity, and consequently, it will not cause significant variations in the intensity of the optical output signal. Accordingly, in the present invention, the effects of backscatter are reduced by utilizing as the light source 10, a laser having a relatively short coherence length, for example, one meter or less. By way of specific example, the light source 10 may comprise the model GO-DIP laser diode, commercially available from General Optronics Corp., as mentioned above.

An alternative method of prohibiting destructive or constructive interference between the backscattered waves and the propagating waves involves the inclusion of an additional phase modulator in the system at the center of the fiber loop 14. This phase modulator is not synchronized with the modulator 38.

The propagating waves will pass through this additional phase modulator one time only, on their travel around the loop. For backscatter which occurs from a propagating wave before the wave reaches the additional modulator, the backscatter will not be phase modulated by this additional modulator, since neither its source propagating wave nor the backscatter itself has passed through the additional modulator.

On the other hand, for backscatter which occurs from a propagating wave after the wave passes through this additional phase modulator, the backscatter will be effectively twice phase modulated, once when the propagating wave passed through the additional phase modulator, and once when the backscatter passed through the additional modulator.

Thus, if the additional phase modulator introduces a phase shift of d(t), the backscattered wave originating at any point except at the center of the loop 14 will have a phase shift of either zero, or 2d(t), either of which is time varying with respect to the d(t) phase shift for the propagating wave. This time varying interference will average out over time, effectively eliminating the effects of the backscatter.

In yet another alternative method of prohibiting destructive or constructive interference from backscatter, the additional phase modulator, not synchronized with the modulator 38, may be introduced at the output of the light source 10.

In this case, backscatter occurring at any point other than the center of the loop 14 will have a different optical path length from the light source 10 to the detector 30 than does the propagating wave from which the backscatter originated.

Thus, the propagating wave will traverse the loop 14 one time, while the backscattered wave and the propagating wave from which it originated will have traversed a portion of the loop 14 twice. If this portion is not one-half of the loop, the path lengths differ.

Because the path lengths differ, a propagating wave which reaches the detector 30 will have been generated at the source 10 at a different time than a backscattered wave which reaches the detector 30 simultaneously.

The phase shift introduced by the additional phase modulator at the source 10 introduced a phase shift d(t) relative to the propagating wave, but a phase shift of d(t+K) to the backscattered wave, where K is the time difference between the passage of the waves through the modulator. Since d(t+K) is time varying with respect to d(t), the backscattered interference will average out over time, effectively eliminating the effects of the backscatter.

Extended Dynamic Range Detection System

The detection system described above with reference to FIGS. 1–10 is a very effective rotation sensing system within a certain range of rotational velocities for the loop 14. However, the dynamic range is limited by certain phenomena. Referring to FIG. 9, it can be seen that the curve 80 is periodic. Therefore, if a large rotation rate causes a large enough $\Delta\phi_R$ to move the curve 94 past either the point 97 or the point 95, then the function 96 could repeat itself for a second, higher rotation rate. This second rotation rate would be substantially greater than the rotation rate which caused Sagnac phase shift $\Delta\phi_R$ depicted in FIG. 9, but would be indistinguishable from the lower velocity using the output optical signal 96. That is, if the $\Delta\phi_R$ from some larger rotational velocity were sufficiently large to move the curve 94 so as to operate between two new points 99' and 101' on the second lobe of the curve 80, then the output optical signal 96 would be indistinguishable in such a case from the case shown where the curve 94 operates between the points 110 and 101.

Figure 24:
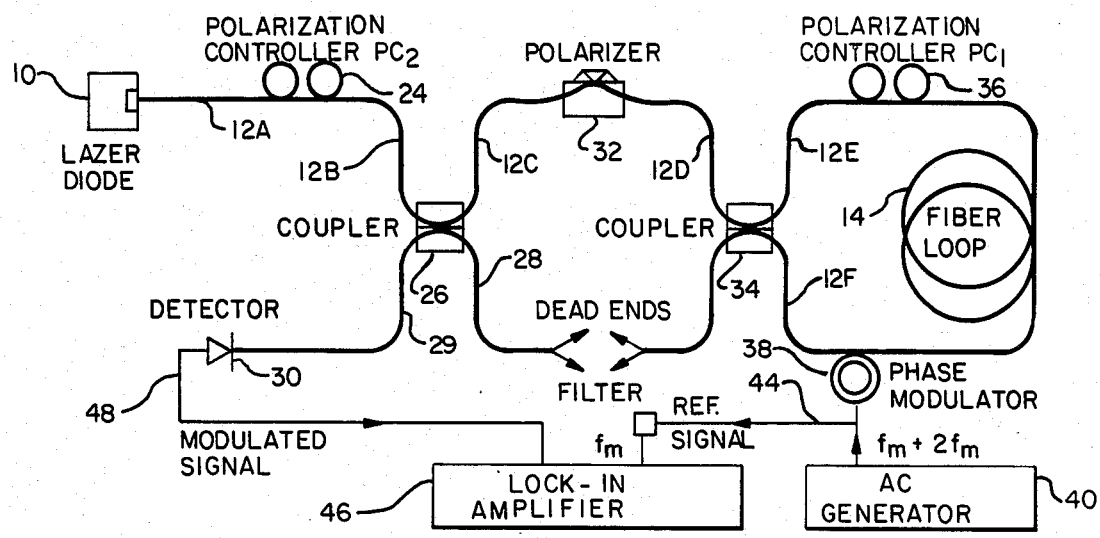
FIG. 24 is a diagram of an open loop embodiment of the extended range rotation sensor.

To extend the range of detection, a second harmonic phase modulation scheme can be used. This apparatus is shown in FIG. 24 for an open loop configuration and in FIG. 11 for a closed loop configuration.

Figure 11:
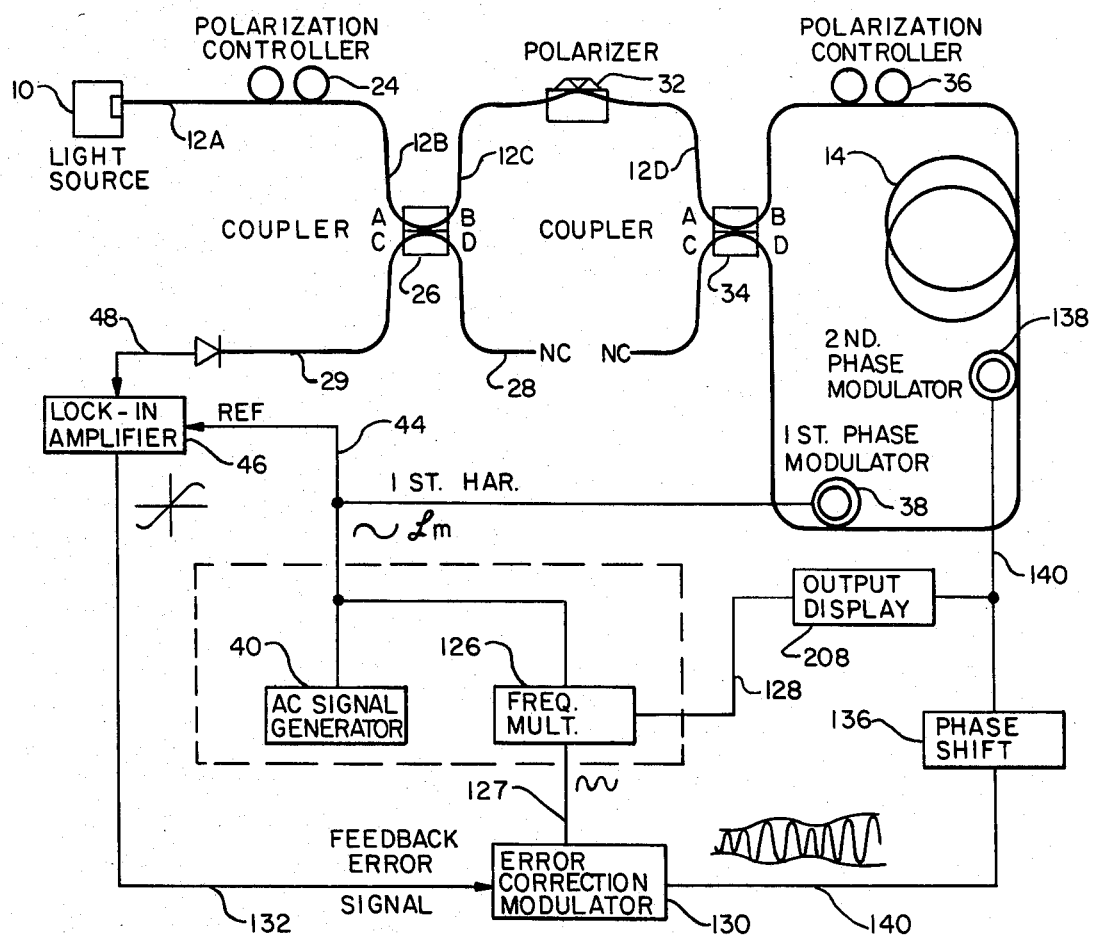
FIG. 11 is a diagram of the preferred embodiment of a closed loop rotation sensor with extended dynamic range.

Referring to FIG. 11 there is shown a diagram of the preferred closed loop embodiment of the detection system invention. All the like numbered components between FIGS. 11 and 1 have the same structure and function in FIG. 11 as they had in FIG. 1. The circuit of FIG. 11 differs from that of FIG. 1 in that it includes a feedback loop which utilizes the lock-in amplifier output represented by the curve 100, as a feedback signal which controls the driving voltage on second phase modulator 138 in the loop 14. The second phase modulator 138 produces a first harmonic signal in the optical output signal which cancels the first harmonic signal 98 generated by rotation of the loop 14, so that the lock-in amplifier output is driven toward zero, regardless of the loop rotation rate. Accordingly, the lock-in amplifier output in the circuit of FIG. 11 provides an error signal for the feedback loop, and thus, will be referred to subsequently as a "feedback error signal". A detailed discussion of the structure and function of the feedback circuit of FIG. 11 is provided below. From that discussion, it will become apparent that the feedback circuit of FIG. 11 provides an extended dynamic range of rotation sensing, and that such rotation sensing is accomplished through measurement of the driving voltage on the second phase modulator 138. In FIG. 11 a single AC generator 40 is shown to generate the first harmonic driving signal on the line 44 for the first harmonic phase modulator 38. A frequency doubler 126 receives the first harmonic driving signal on the line 44 and doubles its frequency to produce a second harmonic component on a line 128.

The second harmonic signal on the line 127 is coupled to the input of an error correction modulator circuit 130. This correction modulator 130 receives the feedback error signal on a line 132 from the output of the lock-in amplifier 46. As in FIG. 1, the lock-in amplifier receives the output signal from the photodetector 30 on the line 48 and a reference signal on the line 44. In this case, the reference signal on the line 44 is the first harmonic signal output from the AC signal generator 40. The error signal generated by the lock-in amplifier 46 on the line 132 is proportional to the amplitude of the Fourier component of the input signal on the line 48 which matches the frequency of the reference signal on the line 44. This error signal will lie somewhere on the curve 100 of FIG. 10. In this particular case, the error signal will be some D.C. level on the curve 100 for a fixed rotation rate resulting in a fixed amplitude of the first harmonic component on the input line 48. If the amplitude of the first harmonic component changes, the D.C. level of the error signal will change as the operating point shifts along the curve 100.

As explained previously, the curve 100 is periodic because the curve 80 in FIG. 9 is periodic. Therefore, the magnitude of the first harmonic component of the optical output signal 96 will vary periodically as increasing Sagnac phase shifts push the total phase shift curve 94 out into other lobes of the curve 80. That is, the point 134 (FIG. 10) on the curve 100 represents a situation where the Sagnac phase shift has pushed the curve 94 out far enough so that maxima and minima of the total resultant phase shift curve translate through symmetrically balanced points on the second lobe of the curve 80. The resultant output waveform 96 would look like the output optical signal 96 depicted in FIG. 8 for the zero rotation rate case and would have no first harmonic component. Because the waveform 96 has no first harmonic component in this situation, the output of the lock-in amplifier would be zero despite the fact that the rotation rate is non-zero.

The detection system of the invention solves this problem by adding a periodic phase modulation which has a frequency greater than that of the first harmonic phase modulation, which in the preferred embodiment is a harmonic of the first harmonic, preferably the second harmonic, and which has an amplitude sufficient to cause a first harmonic component in the optical output signal which is approximately equal in amplitude to the first harmonic component caused by the Sagnac phase shift but 180° out of phase with it. This second frequency of phase modulation thus cancels substantially all the rotationally caused first harmonic component in the optical output signal.

The function of converting the feedback error signal on the line 132 into a cancellation amplitude for the second harmonic phase modulation, i.e., a second harmonic drive signal of sufficient amplitude to cancel the first harmonic component in the optical output, is performed by the error correction modulator 130, the phase shifter 136 and the second harmonic phase modulator 138.

The error correction modulator 130, upon receiving a non-zero error signal on the line 132, receives the second harmonic signal on the line 127 and increases or decreases its amplitude in response to the magnitude and sign of the error signal so that the magnitude of the error signal on the line 132 is reduced to zero or to within a predetermined range of zero. When the predetermined level for the error signal on the line 132 is reached, the modulator 130 holds the level of the second harmonic steady at the amplitude which causes that zero or small value for the error signal until the error signal again changes. Upon a change in the error signal, the modulator 130 again changes the amplitude of the second harmonic driving signal on the line 140 until the error signal on the line 132 is again reduced to zero or to within a predetermined range of zero.

That is, the error correction modulator 130 uses the feedback error signal on the line 132 to adjust the amplitude of the second harmonic driving signal on the line 140. This second harmonic driving signal has a frequency which is twice that of the first harmonic driving signal and its phase is shifted relative to the first harmonic phase modulation drive waveform by the phase shift circuit 136. The phase is shifted such that the maxima and minima of the second harmonic waveform correspond in time to the maxima, minima and zero crossings of the first harmonic phase modulation drive waveform. Further, the amplitude of the second harmonic phase modulation waveform is set by the correction modulator 130 to the level of drive which will cause cancellation of the first rotationally induced harmonic component in the optical output signal resulting from the Sagnac phase shift. This will be better understood by examination of FIG. 12.

Figure 12:
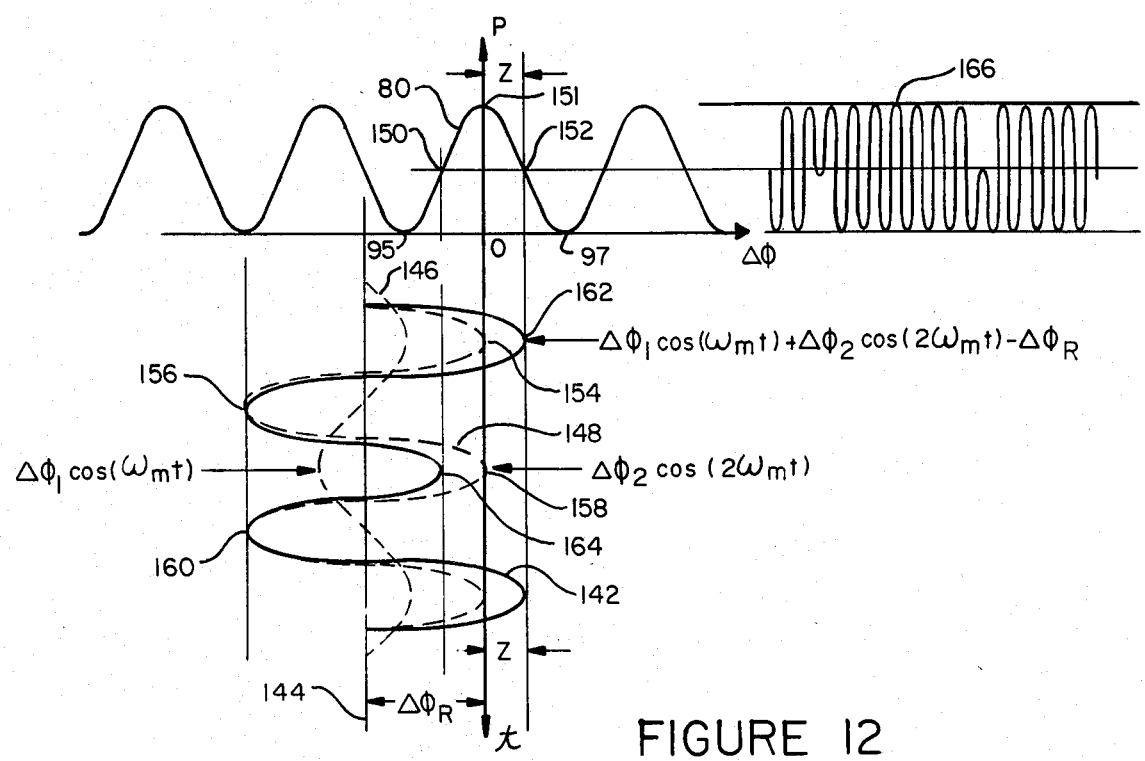
FIG. 12 is a diagram of the overall phase shift resulting from the first and second harmonic phase modulation and the optical output signal which results therefrom.

FIG. 12 shows a graphical relationship between the total resultant relative phase shift between the counter-propagating waves W1 and W2 resulting from the loop rotation and from the phase modulators 38 and 138. The corresponding optical output signal for this overall phase shift is also shown. The resultant or total phase shift curve 142 represents the sum of the Sagnac phase shift $\Delta\phi_R$ (represented by the constant bias 144 for a constant rotational velocity) and the sinusoidally time-varying, first harmonic phase shift $\Delta\phi_1 \cos(\omega_m t)$, (represented by the curve 146), and the sinusoidally time-varying, second harmonic phase shift $\Delta\phi_2 \cos(2\omega_m t)$, (represented by the curve 148). The resultant phase shift $\Delta\phi$ is $\Delta\phi_1 \cos(\omega_m t) + \Delta\phi_2 \cos(2\omega_m t) - \Delta\phi_R$.

It can be seen from FIG. 12 that the magnitude $\Delta\phi_1$ of the first harmonic phase shift of the curve 146 is equal to the quantity Z between the vertical axis p and one of the balanced operating points 150 or 152. It can also be seen that the magnitude $\Delta\phi_2$ of the second harmonic phase shift curve 148 is approximately equal to the magnitude of the Sagnac phase shift $\Delta\phi_R$. When these two conditions are true, and the second harmonic phase shift curve 148 is shifted in phase such that its peaks at 154, 156, 158 and 160 coincide in time with the maxima and minima and zero crossings of the first harmonic phase shift curve 146, certain things will be true about the combined or resultant phase shift and the optical output signal. The most important thing that will be true is that peaks 162 and 164 of the resultant phase shift curve 142 will correspond approximately to phase shifts represented by the symmetrically balanced points 150 and 152 on the curve 80. The points 150 and 152 are symmetrically balanced around the vertical axis p in that each is equidistant from the p axis and each is at the same location on the curve 80 relative to the peak 151. When the points on the resultant phase shift curve 142 are mapped through the curve 80, the resultant output light signal has the intensity versus time waveform shown by a curve 166. Because the curve 166 has no first harmonic component, the error signal on the line 132 from the lock-in amplifier 46 will be zero since the lock-in amplifier filters out all components but the first harmonic component at the frequency $f_m$. The detector 30 puts out an electrical signal proportional to the light intensity curve 166 and therefore this electrical signal on the line 48 also has no first harmonic component.

If the first harmonic phase shift curve did not have an amplitude equal to the quantity Z in FIG. 12, or if the second harmonic component 148 did not have an amplitude approximately equal to $\Delta\phi_R$, the peaks 162 and 164 of the resultant phase shift would not approximately represent balanced, symmetrically located phase shifts at the points 150 and 152. This would result in an output light signal 166 that did not look like the curve 166 and which would have a Fourier first harmonic component. For the detection system of FIG. 11, the AC signal generator 40 is adjusted such that the amplitude $\Delta\phi_1$ of the first harmonic driving signal on the line 44 remains steady at the quantity Z in FIG. 12 and the frequency is maintained at the "proper" frequency as described above. The amplitude Z is chosen as 1.84 radians as previously described. Therefore, if the amplitude $\Delta\phi_2$ of the second harmonic driving signal on the line 140 is adjusted so that it approximately matches the Sagnac phase shift $\Delta\phi_R$ and a phase shifter 136 is placed in the line 140 and adjusted such that the peaks 154, 156, 158, and 160 of the second harmonic phase shift curve 148 coincide in time with the maxima, minima and zero crossings of the first harmonic curve 146, then the resultant phase shift curve will be as shown by the curve 142 in FIG. 12. The result will be a substantial cancellation of the first harmonic component in the output optical signal 166 introduced by the Sagnac phase shift $\Delta\phi_R$. This cancellation is caused by the introduction of a first harmonic component phase shift of equal magnitude and frequency but 180° out of phase with the Sagnac effect first harmonic Fourier component by the action of the second harmonic phase modulator 138. That is, the curve 166 will have two sinusoidal first harmonic components of intensity variation in its Fourier series at the frequency $f_m$. These two components will be equal in magnitude but 180° out of phase with each other. One will be caused by the Sagnac phase shift and the other by the stretching of the fiber at the frequency $2f_m$ in the second harmonic phase modulator 138.

Thus, by adjusting the amplitude $\Delta\phi_2$ of the second harmonic driving signal on the line 140 until the error signal on the line 132 drops to zero or substantially zero it is possible to determine what the rotational speed of the loop is by observing the amplitude of the second harmonic driving signal which caused the zero error signal. And this is true even for high rotational speeds which would ordinarily cause Sagnac phase shifts sufficient to bias the curve 146 in FIG. 12 out into the second, third or higher lobes of the curve 80. This process of adjusting the second harmonic driving signal amplitude until the output of the lock-in amplifier 46 drops to zero can be done manually as would be required in the open loop embodiment, or it could be done automatically as in the closed loop system.

The overall effect then is to allow a measurement of rotation rates which normally would move the operating points for the resultant phase shift curve out into the ambiguous ranges of the second and higher lobes of the curve 80 in FIG. 12, i.e., past the points 95 and 97 on the curve 80 in FIG. 12. That is, the invention provides a means to eliminate the ambiguity in the output signal from the detector for higher rotation rates where prior art sensors would not know which of several possible rotation rates was causing the detector output of that particular characteristic. And this increased dynamic range is gained with no loss of sensitivity, because the slope of the sides of the lobes of the curve 80 is not changed.

In the preferred embodiment, the second harmonic phase modulator 138 is located in the loop 14 at a point midway between the location of the first harmonic phase modulator and the center of the loop 14. At this location, the phase modulator 138 operating at $2f_m$ will be at its "proper" frequency location since the frequency is fixed by the location of the phase modulator 38 at $f_m$.

Figure 13:
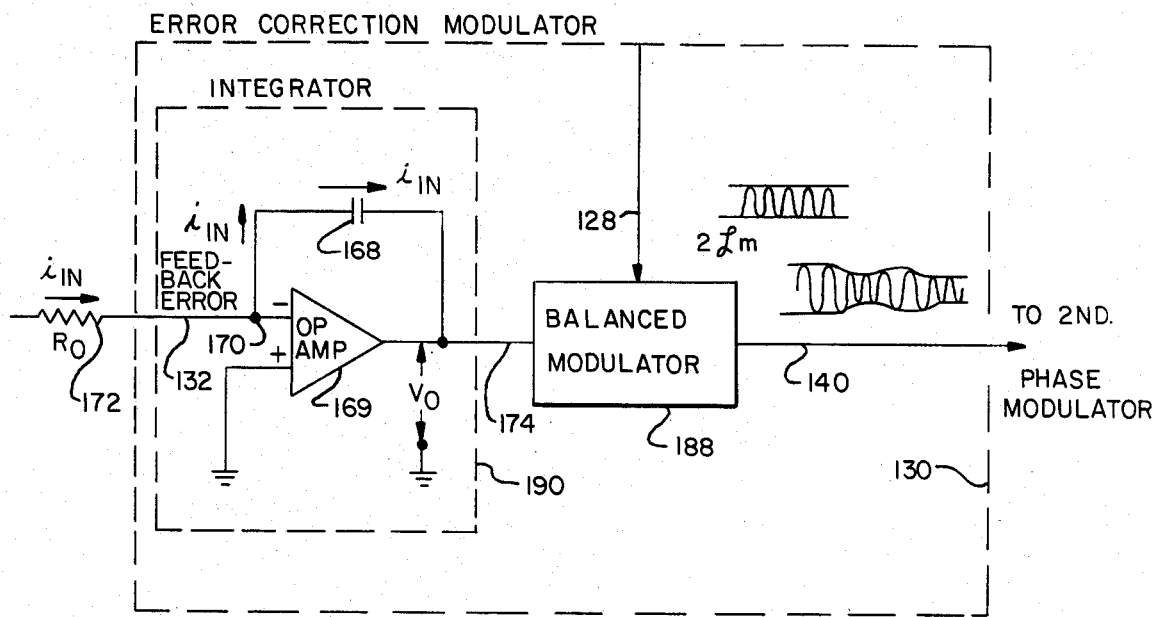
FIG. 13 is a circuit diagram for an error correction modulator.

FIG. 13 shows one embodiment of the error correction modulator 130. In this embodiment, the error signal on the line 132 is coupled to the inverting input of an operational amplifier connected as an integrator. The exact structural details of practical integrators are well known to those skilled in the art and no further discussion of those details will be given here. As is well known in the art of operational amplifiers, the negative feedback voltage developed across the capacitor tends to keep the point 170 at a virtual ground. That is, the voltage at the point 170 is held at or near zero volts by the negative feedback. However, no current flows to ground through this virtual short. The input current $i_{in}$ to the operational amplifier 169 through the output impedance of the lock-in amplifier 46, represented by the impedance $R_o$ 172, is equal to the output error voltage of the lock-in amplifier 46 divided by its output impedance $R_o$, since the impedance to ground from the point 170 is zero. But since no current flows to ground from the node 170, the input current $i_{in}$ flows through the capacitor 168 and an output voltage $V_0$ relative to ground, builds up on the line 174 as a function of time. The expression for the output voltage $V_0$ as a function of time is:

$$V_0 = -\frac{1}{C} \int i_{in} dt \qquad (11)$$

where C is the value of the capacitor 168.

Figure 14:
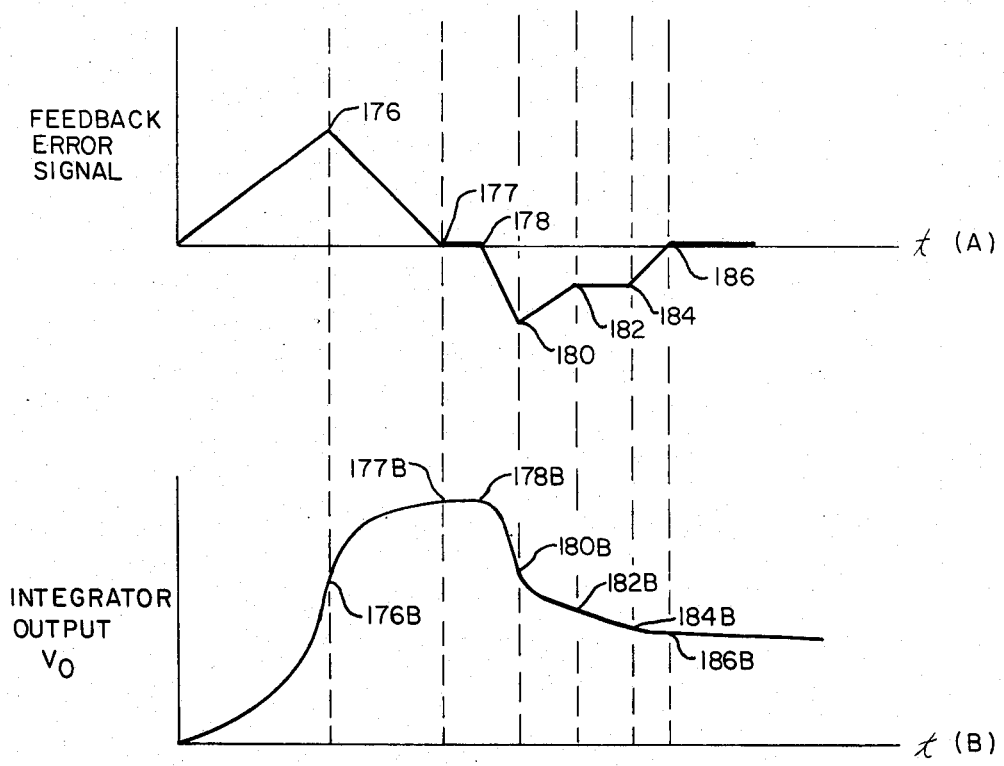
FIG. 14 is a diagram of the response of the modulator of FIG. 13 to a sample error signal.

Referring to FIG. 14, there are shown the response characteristics for the operational amplifier integrator 169. FIG. 14(A) shows a hypothetical error signal on the line 132. The output voltage $V_0$ of the integrator on the line 174 is plotted in FIG. 14(B).

It can be seen from FIG. 14(B) that for zero error signals, the output voltage curve has zero slope and for increasing magnitudes of non-zero error signals, the magnitude of the slope of the output voltage curve for $V_0$ increases. That is, the sign of the slope depends upon whether the error signal is positive or negative, and the steepness of the slope at any instant in time depends upon the magnitude of the error signal at that instant in time.

As the error signal increases from the origin to the point 176, the integrator output signal $V_0$ increases to the point 176B. Referring again to FIG. 13, a conventional balanced modulator such as an MC1496L, manufactured by Motorola, and associated circuits converts this input voltage $V_0$ on the line 174 to corresponding changes in the envelope of the second harmonic driving signal on the line 140. That is, the modulator 188 amplitude modulates the fixed amplitude second harmonic signal on the line 128 with the signal on the line 174. This second harmonic driving signal on the line 140 is then shifted in phase in the conventional phase shifter 136 in FIG. 11 and applied to the second harmonic phase modulator 138.

As the amplitude of the second harmonic driving signal on the line 140 increases, the amplitude of the first harmonic component in the optical output signal caused by the second harmonic phase modulator 138 begins to rise. When it rises far enough, it tends to cancel the first harmonic component caused by the rotation. This tends to reduce the error signal as shown between the points 176 and 177 in FIG. 14(A). The decreasing error signal changes the steepness of the slope of the integrator output voltage $V_0$ in FIG. 14(B) as shown between the points 176B and 177B. At the point 177 in FIG. 14(A), the magnitude of the second harmonic driving signal is just enough to cancel all of the rotation caused first harmonic component in the optical output, and thus the error signal will be zero. This is reflected by a flat, non-zero portion of the integrator output voltage curve for $V_0$ between the points 177B and 178B.

At the time 178 in this hypothetical situation, the rotation rate of the loop 14 changes such that the error signal changes sign and begins to increase in magnitude as shown between 178 and 180 in FIG. 14(A). This causes a decrease in the output voltage $V_0$ because the current $i_{in}$ changes directions and the voltage on the capacitor 168 begins to change. This is shown between the points 178B and 180B in FIG. 14(B). The effect is to decrease the amplitude of the second harmonic driving signal which causes the error signal to trend back toward zero as seen between the points 180 and 182 in FIG. 14(A).

At the time 182 in the hypothetical situation, the rotation of the loop 14 again changes that more first harmonic component is generated by the Sagnac phase shift so as to flatten the error signal curve as illustrated between the points 182 and 184. This causes the integrator output voltage to ramp downward at a constant slope to decrease the amplitude of the second harmonic phase modulator between the points 182B and 184B.

At the time 184, the rotation rate of the loop again changes but the error signal is still negative and non-zero. The non-zero error signal causes the integrator output voltage $V_0$ to continue to decrease, thereby changing the amplitude of the second harmonic driving signal and causing the error signal to move toward zero as shown between the points 184 and 186.

Once the error signal reaches zero, the integrator output voltage holds steady at whatever cancellation amplitude cancelled all or substantially all of the Sagnac generated first harmonic component. The situation at the time 186 represents a non-zero constant rotation rate in the loop 14 where the amplitude of the second harmonic driving signal on the line 140 has been adjusted to the proper level to just cancel the Sagnac-generated first harmonic component in the optical output signal. This situation represents operation between the balanced points 150 and 152 in FIG. 12.

Those skilled in the art will appreciate that if rotation continues accelerating in one direction, the output voltage $V_0$ could rise above safe levels and cause component failures in, for example, the amplitude modulator 188 for the circuit of FIG. 13. To prevent such occurrences, voltage limiting devices should be coupled to the integrator to limit the maximum positive and negative voltage excursions of $V_0$.

Figure 15:
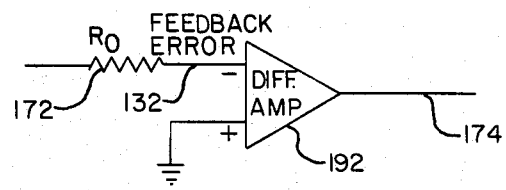
FIG. 15 is a diagram of the preferred error correction modulator.

Referring to FIG. 15, there is shown the preferred embodiment for a portion of the error-correction modulator circuit 130 to replace the integrator 190 in FIG. 13. In this embodiment, a differential amplifier 192 has its inverting input coupled to the error signal on the line 132 and has its output is coupled to the amplitude modulator 188 by the line 174.

Figure 16:
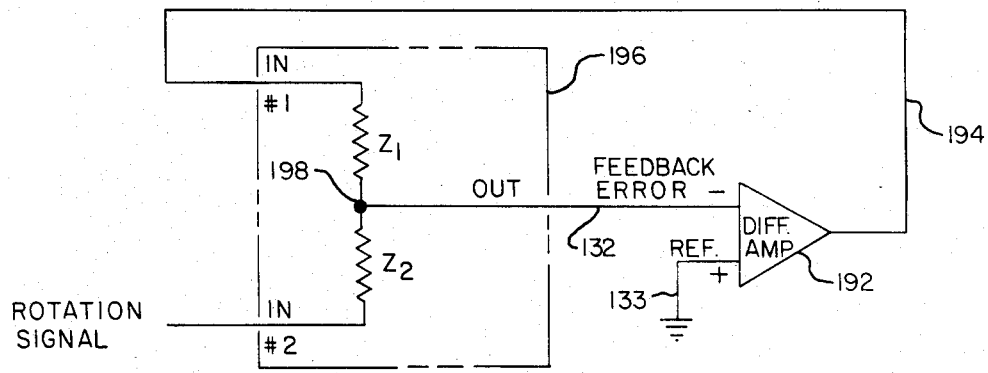
FIG. 16 is a schematic diagram of the overall sensor using the error correction modulator of FIG. 15.

The manner in which the system depicted in FIG. 15 works is better understood with reference to FIG. 16, which depicts the overall rotation sensor in schematic terms with the components in the sensor represented by a three-port network 196 coupled to the differential amplifier 192. The optical portion and most of the electronic components of the sensor have been represented by the voltage divider impedance network 196 which has two inputs coupled to either end of the two impedances $Z_1$ and $Z_2$. The midpoint of this divider is coupled to the inverting input of the differential amplifier 192. When a rotation is applied to the loop, a rotation signal (symbolic) will be applied to the second input of the three port network 196 which results in an error signal being applied to the line 132 coupled to the inverting input of the differential amplifier 192. The difference between this input error signal and the reference signal on the line 133, which in this case is ground potential, is amplifier by the differential amplifier 192 and the inverted, amplified difference signal is applied to the output line 194. This output line is also coupled to the first input of the network 196 such that the negative feedback occurs through the impedance $Z_1$ tending to cancel the voltage at the point 198 caused by the rotation signal. The signal on the line 194 then tends to minimize the voltage swings at the point 198. The point 198 physically represents the output of the lock-in amplifier 46 in FIG. 11. The impedances $Z_1$ and $Z_2$ are virtual impedances representing the overall transfer function and loop gain of the optical and electronic portions of the system.

The time response, phase margin, bandwidth and sensitivity of the system are matters of design choice depending upon the application and standard feedback system analysis can be used to establish system parameters.

The effect of the feedback through the impedance $Z_1$ is to restrict the swings in the error signal on the output line 132 of the lock-in amplifier to a small range represented by the box 200 in FIG. 10. The range is a matter of design choice and depends upon the gain of the differential amplifier 192. Higher gain results in a smaller range of variation of the input signal, i.e., a smaller box but less stability.

Any structure which reacts to non-zero error signals so as to reduce the error signal to zero or substantially zero by increasing or decreasing the magnitude of the second harmonic driving signal on the line 140 will suffice for purposes of the invention. For some embodiments it will be desirable to maintain the level of the second harmonic driving signal at the cancellation amplitude and phase relative to the first harmonic driving signal, which reduces the error signal to zero or near zero. The exact circuit used to accomplish this function is not critical to the invention.

Figure 17:
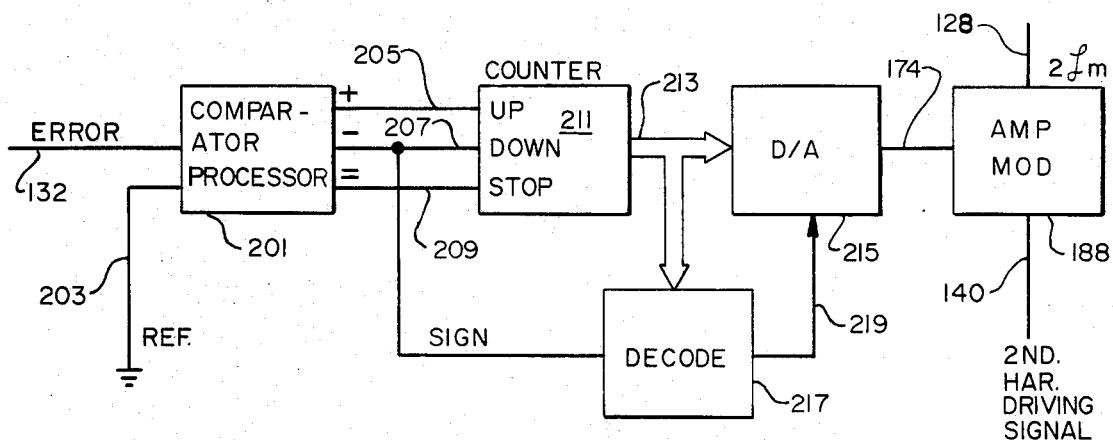
FIG. 17 is a diagram of another error correction modulator which could be used in the closed loop embodiment of FIG. 11.

An alternative circuit which could be used for the error correction modulator is as shown in FIG. 17. In this embodiment, the error signal on the line 132 is coupled to the input of a comparison processor 201. The comparison processor has a reference voltage applied to its reference input 203 which is ground potential in this case. The comparison processor compares the error signal on the line 132 with the reference signal on the line 203 and generates one of three outputs. If the error signal is positive and non-zero, the output line 205 is activated as with a logic one level. If the error signal is negative and non-zero, the line 207 is activated. Finally, if the error signal is equal to the reference signal, the line 209 is activated.

An up-down counter 211 has its up input coupled to the line 205 and begins counting up from zero when the line 205 is active. The binary count is continually changing the digital pattern on the output bus 213 as the count progresses where the data on the bus 213 at any moment represents the binary representation of the count.

A digital to analog converter continuously or periodically samples the value of the binary count on the bus 213 and converts the digital data to an analog output signal on the line 174. This analog signal is used by the conventional amplitude modulator 188 to amplitude modulate the second harmonic driving signal on the line 128 and apply it to the line 140.

The changing amplitude of the second harmonic driving signal is reflected in a changing error signal on the line 132. That is the error signal will be trending toward the reference signal voltage.

When the error signal reaches the reference voltage, the comparator processor 201 activates the line 209 which is coupled to the stop input of the counter 211, thereby stopping the count. The D/A converter then holds the amplitude level of the second harmonic driving signal steady at the then existing level until the error signal changes again.

When the error signal becomes negative and non-zero, the process repeats itself but the counter 211 starts counting down from zero or from the then existing positive count. If the count was zero when the line 207 was activated, a decoder 217 activates a change sign line 219 which causes the D/A converter to change the sign of the analog output voltage on the line 174. If the count was not zero when the line 207 was activated, the decoder 217 does not activate the line 219, and the D/A converter leaves the analog signal on the line 174 in the same sign as when the line 205 was activated but begins to lower the amplitude as the count decreases. This process continues until the line 209 is activated.

To determine whether the rotation sensor is linear the transfer function relating the amplitude of the second harmonic waveform to the magnitude of the Sagnac phase shift must be derived. Mathematically this is done by deriving the expression for the output optical signal and solving for the first harmonic thereof. The output optical signal can be expressed by substituting the expression for the resultant phase shift shown in FIG. 12 as the curve 142 as the argument for the expression of the curve 80 in FIG. 12. The curve 80 can be expressed as:

$$P(t) = P_o/2(1 + \cos(\Delta\phi)) \quad (12)$$

$P(t)$ = the output optical power as a function of time;
$P_o$ = the peak output optical power; and
$\Delta\phi$ = the total phase shift between the counter-propagating waves W1 and W2.

Substituting the expression for the curve 142 for $\Delta\phi$ in Equation (12) gives:

$$P(t) = \frac{P_o}{2} [1 + \cos\{\Delta\phi_1\cos(\omega_m t) + \Delta\phi_2\cos(2\omega_m t) - \Delta\phi_R\}]$$

where all terms are defined as used in Equation (12) and FIG. 12.

Solving for the first harmonic component of the Fourier transform of Equation (13) gives:

$$P_f(t)\alpha\sin(\Delta\phi_R) \left[ J_o(\Delta\phi_2)J_1(\Delta\phi_1) + \sum_{n=1}^{\infty} (-1)^{n+1} J_{2n}(\Delta\phi_2)\{J_{4n-1}(\Delta\phi_1) - J_{4n+1}(\Delta\phi_1)\} \right] - \quad (14)$$

$$\cos(\Delta\phi_R) \sum_{n=1}^{\infty} (-1)^{n+1} J_{2n-1}(\Delta\phi_2) \{J_{4n-3}(\Delta\phi_1) - J_{4n-1}(\Delta\phi_1)\}$$

where $J_n$ = the Bessel function of the first kind.

Therefore, the relationship between the Sagnac phase shift $\Delta\phi_R$ and the magnitude $\Delta\phi_2$ of the second harmonic phase shift at the frequency $2f_m$ to exactly cancel the first harmonic component in the optical output signal caused by the Sagnac phase shift is:

$$\tan\Delta\phi_R = \frac{\sum_{n=1}^{\infty} (-1)^{n+1} J_{2n-1}(\Delta\phi_2)\{J_{4n-3}(\Delta\phi_1) - J_{4n-1}(\Delta\phi_1)\}}{J_o(\Delta\phi_2)J_1(\Delta\phi_1) + \sum_{n=1}^{\infty} (-1)^{n+1} J_{2n}(\Delta\phi_2)\{J_{4n-1}(\Delta\phi_1) - J_{4n+1}(\Delta\phi_1)\}} \quad (15)$$

Figure 18:
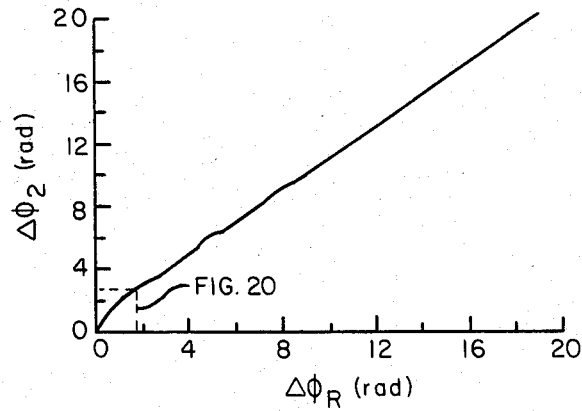
FIG. 18 is a graph of the transfer function of the rotation sensor.

When Equation (15) is plotted, the curve is as illustrated in FIG. 18. This curve shows that the sensor is substantially linear for large Sagnac phase shifts but deviates slightly from linearity for small Sagnac phase shifts.

Figure 19:
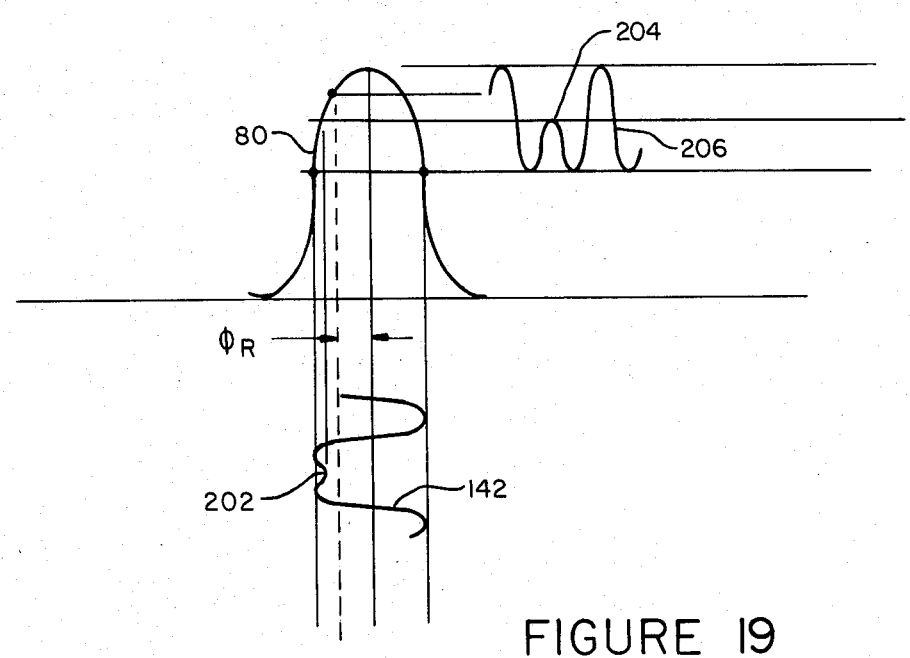
FIG. 19 is a graph of the overall phase shift for first and second harmonic phase modulation and small rotation rates.

The resultant phase shift curve for a small Sagnac phase shift $\Delta\phi_R$ and a small amplitude second harmonic $\Delta\phi_2$ is shown in FIG. 19 as the curve 142. The small "bump" at 202 translates through the curve 80 to the "bump" 204 in the curve 206 for the optical output signal.

Figure 20:
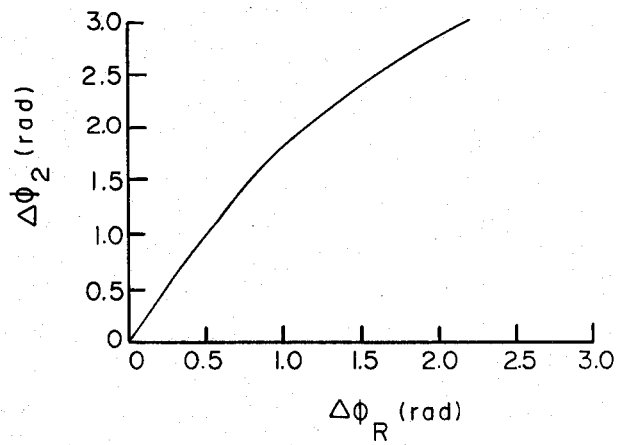
FIG. 20 is a graph of the transfer function of the sensor for small rotation rates.

The transfer function for Sagnac phase shifts up to 2.5 radians is plotted in FIG. 20 versus the amplitude $\Delta\phi_2$ of the second harmonic component and needed to cancel the effects of the Sagnac phase shift $\Delta\phi_R$. FIG. 20 shows more clearly the distinct curvature in the transfer function in this small Sagnac phase shift region. The dots along the curve in FIG. 20 represent experimentally determined data points.

Because the transfer function is nonlinear in some regions, linear elements used to translate the amplitude of the second harmonic driving signal to the magnitude of the Sagnac phase shift introduce errors. A device may be used at the output to store the transfer function or to solve the transfer function for the rotation rate or Sagnac phase shift given the cancellation amplitude of the second harmonic driving signal. That is, it is advantageous to convert from the amplitude of the second harmonic driving signal on the line 140 which cancels the first harmonic component in the output due to the Sagnac phase shift to the rotation rate or Sagnac phase shift itself. Such is the purpose of the output display circuit 208 in FIG. 11.

Figure 21:
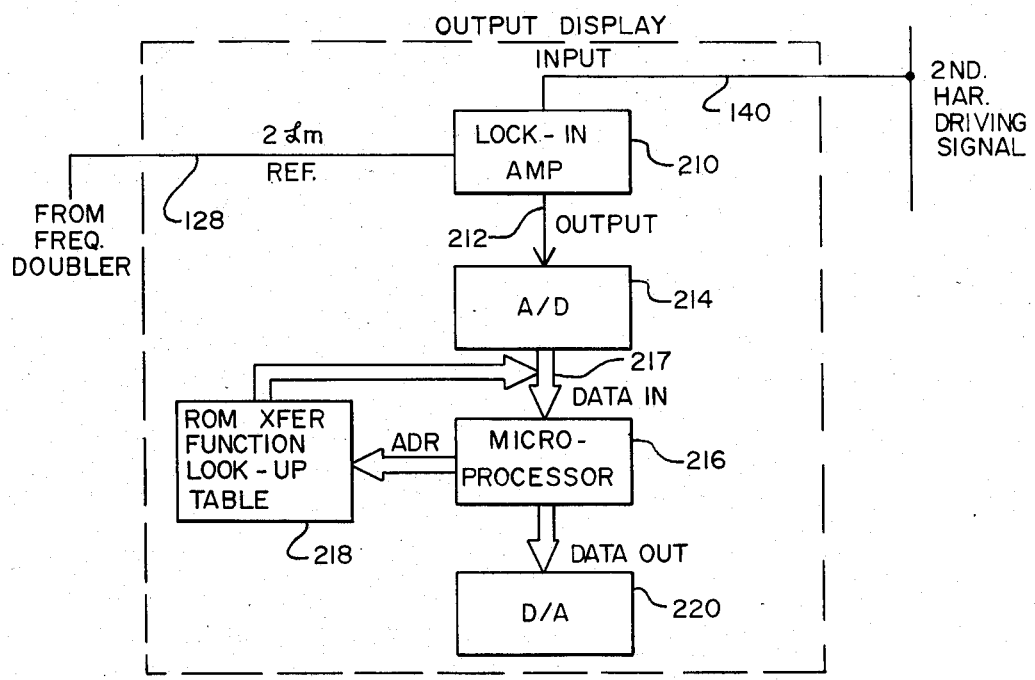
FIG. 21 is a diagram of the preferred embodiment of an output circuit for the rotation sensor for converting the amplitude of the second harmonic driving signal to the rotation rate.

FIG. 21 shows the preferred circuit for the output display 208. The second harmonic driving signal on the line 140 is coupled to the input of a lock-in amplifier 210. The lock-in amplifier is tuned to the second harmonic driving signal, i.e., it has as its reference signal the unmodulated second harmonic signal on the line 128 from the frequency doubler 126 in FIG. 11. The purpose of the lock-in amplifier 210 is to filter out all noise on the line 140 which clutters the desired second harmonic waveform. This noise can result from noise on the power lines, electromagnetic disturbances, cross talk with the first harmonic driving signal on the line 44 and other miscellaneous sources such as distortion in the frequency multiplier.

The output signal on the line 212 is proportional to the amplitude of the filtered second harmonic driving signal at the output 212 of the lock-in amplifier, and is coupled to an analog to digital (A/D) converter 214 where it is converted to digital data. This data is used by a microprocessor or computer 216 to address a look-up table in a memory 218 which stores digital data regarding the rotation rate which corresponds to each amplitude of the second harmonic driving signal as determined by the transfer function of Equation (15).

The digital data at the output 217 of the A/D converter 214 is used by the microprocessor 216 to access the proper address in the ROM 218 which stores the digital data indicating the corresponding Sagnac phase shift or rotation rate for that particular amplitude of the second harmonic driving signal on the line 140. The program for the microprocessor 216 to perform this addressing function will be apparent to those skilled in the art and any program to perform this function will suffice. The digital data output from the ROM can then be converted to analog form by a digital to analog converter 220 or it can be used in its digital form.

In other embodiments, the microprocessor 216 could be programmed to solve the transfer function of Equation (15) by using the data from the A/D converter 214 as the variable $\Delta\phi_2$. In these embodiments, the ROM 218 would contain the program for performing the calculation required in Equation (15). The exact program used to perform this calculation is not critical, and programs will be known to those skilled in the art to perform this calculation. Any program which can perform this calculation will be adequate for purposes of the invention.

Figure 22:
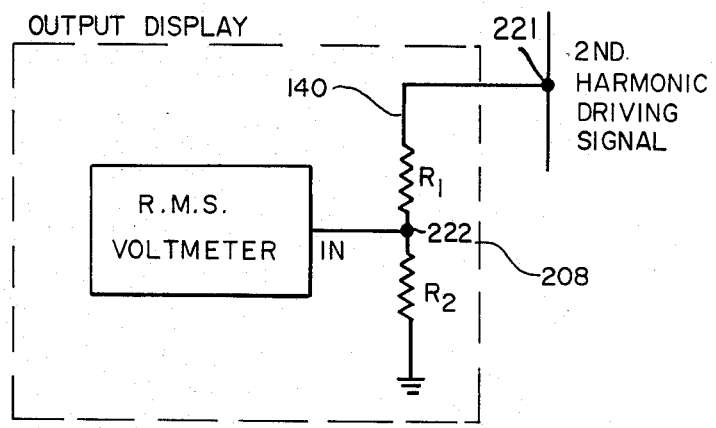
FIG. 22 is a diagram of an output display circuit which could be used in linear regions of the transfer function.

Other embodiments might use an R.M.S. voltmeter instead of the lock-in amplifier 210, but such a structure would lead to errors since any noise on the line 140 might be averaged in and misinterpreted as false amplitude of the second harmonic driving signal. The R.M.S. voltmeter has its input at the midpoint of a voltage divider as shown in FIG. 22. The second harmonic driving signal is applied to the node 221 of a voltage divider comprised of the resistors R1 and R2. The resistors R1 and R2 are selected to reflect the slope of the transfer function in the linear region such that for a given amplitude of second harmonic driving signal at the node 221 a signal having an amplitude proportional to the rotation rate will be developed at the node 222. This signal is coupled to the input of an R.M.S. voltmeter to be read as the Sagnac phase shift or rotation rate.

Figure 23:
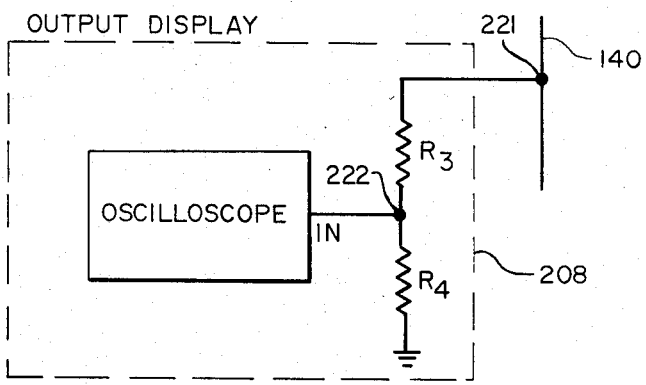
FIG. 23 is a diagram of another output display circuit which could be used in linear regions of the transfer function.

Further, an oscilloscope could also be used instead of an R.M.S. voltmeter, as shown in FIG. 23, to detect the amplitude of the second harmonic driving signal. Again a linear scaling network comprised of the resistors R3 and R4 to scale the input to the oscilloscope. The embodiments of FIGS. 22 and 23 are most accurate in the linear regions of the transfer function.

Any other device capable of measuring waveforms at the second harmonic frequency could also be used for the output display circuit 208. For example, analog curve matching devices could be used to compensate for the transfer function curve and give an output proportional to the rotation rate. Further, the ROM look-up table and microprocessor of FIG. 21 could be dispensed with in the approximately linear regions of the transfer function curve such that a simplified FIG. 21 embodiment could also be used in the approximately linear region for an approximate result.

The open loop embodiment of FIG. 24 works in the same fashion as the closed loop embodiment of FIG. 11 except that there is no feedback.

Referring to FIG. 24, the basic structure for this two harmonic, open-loop structure is the same as shown in FIG. 1 except for one variance. That is that the AC generator 40 generates a driving signal for the phase modulator 38 which has a first harmonic component at the frequency $f_m$ and a second harmonic component at the frequency 2 $f_m$. The effect of the second harmonic component is the same as described above with respect to FIG. 11. All the other components in the embodiment of the invention depicted in FIG. 24 are the same structure and have the same function as their counterparts in FIG. 1. The AC generator 40, however, is slightly modified such that the magnitude of the second harmonic component can be controlled manually to an amplitude sufficient to cancel the component in the optical output signal at the first harmonic frequency caused by the rotation.

The method of the invention for detecting the rotation rate of the loop includes the steps of causing counterpropagating light waves in the loop to be phase modulated at a first harmonic frequency of $f_m$. The amplitude of the first harmonic component at the frequency $f_m$ is then detected in the optical output signal of the loop. The counterpropagating light waves are then phase modulated at the second harmonic frequency, i.e., 2 $f_m$, at an amplitude sufficient to cancel the first harmonic component in the optical output signal caused by rotation.

More precisely, the amplitude of the first harmonic component of the optical output signal is converted to a D.C. error signal proportional thereto. The error signal is then used to control the amplitude of a second harmonic driving signal for a second harmonic phase modulator in the loop. The level of the second harmonic driving signal is then increased or decreased until the error signal indicates a substantially zero amplitude level for the first harmonic component in the optical output signal. The amplitude of the second harmonic driving signal which reduced the amplitude of the first harmonic component in the optical output signal to zero is a measure of the rotation rate of the loop.

The method of calculating the rotation rate of the Sagnac effect rotation sensor comprises sensing the amplitude of the first harmonic component in the optical output signal of the sensor at the first frequency at which the first phase modulator is operating. The counter-propagating light waves in the rotation sensor are then phase modulated at a second frequency which should be, in the preferred embodiment, an exact harmonic of the first frequency. Other second frequencies can cause time variant components in the error signal which significantly affect the stability of the loop causing drift and "hunt". The amplitude and phase of the second frequency phase modulation is adjusted relative to the first frequency phase modulation so as to cancel the component of the optical output signal at the first frequency. The characteristics of the phase modulation at the second frequency and at the cancellation amplitude are then converted through a transfer function to the corresponding rotation rate.

What is claimed is:

1. An apparatus for sensing an ambient effect such as rotation, comprising:
   (A) a loop of fiber optic material for forming an optical path sensitive to said ambient effect;
   (B) means for introducing light into said loop;
   (C) means for sensing said light in said loop to produce a feedback signal responsive to said ambient effect;
   (D) means, responsive to said feedback signal, for nulling said feedback signal, to increase the sensing range of said apparatus, said nulling means producing an output signal varying with said ambient effect in accordance with a non-linear relationship; and
   (E) an output circuit for superimposing a non-linear transfer function on said output signal.

2. An apparatus as defined in claim 1 wherein said output circuit includes a memory for storing data related by said non-linear transfer function to said output signal.

3. An apparatus as defined in claim 2 wherein said output circuit further includes a computer for converting said output signal to an address in said memory where said data is stored.

4. An apparatus as defined in claim 2 wherein said output circuit comprises:
   a lock-in amplifier having an input coupled to said output signal;
   an analog-to-digital converter for converting the output of said lock-in amplifier to digital data; and
   a computer for converting said digital data from said analog-to-digital converter to an address for the corresponding data stored in said memory and for retrieving said data stored in said memory.

5. An apparatus as defined in claim 1 wherein said sensing means includes a first phase modulator and said nulling means includes a second phase modulator, said first and second phase modulators driven by a first driving signal and a second driving signal, respectively, said driving signals at the first and second harmonics, respectively of a frequency $f_m$, and wherein said transfer function is defined by the equation:

$$\tan\Delta\phi_R = \frac{\sum_{n=1}^{\infty} (-1)^{n+1} J_{2n-1}(\Delta\phi_2)\{J_{4n-3}(\Delta\phi_1) - J_{4n-1}(\Delta\phi_1)\}}{J_0(\Delta\phi_2)J_1(\Delta\phi_1) + \sum_{n=1}^{\infty} (-1)^{n+1} J_{2n}(\Delta\phi_2)\{J_{4n-1}(\Delta\phi_1) - J_{4n+1}(\Delta\phi_1)\}}$$

where:
$J_x$ = the Bessel function of the first kind defining the harmonic of x times said first frequency;
$\Delta\phi_R$ = a phase shift of said light in said loop caused by said ambient effect;
$\Delta\phi_1$ = the amplitude of the first harmonic phase modulation caused by said first phase modulator;
$\Delta\phi_2$ = the amplitude of the second harmonic modulation caused by said second phase modulator.

6. An apparatus as defined in claim 5 wherein said sensing means comprises a photodetector coupled to the input of a lock-in amplifier which utilizes said first driving signal as a reference frequency.

7. An apparatus as defined in claim 1 wherein said nulling means includes an error correction modulator which responds to non-zero feedback signals by raising or lowering the amplitude of said output signal until said feedback signal is substantially zero.

8. An apparatus as defined in claim 1 wherein said light in said loop is phase modulated at the frequency of said feedback signal by an A.C. signal generator driving a first phase modulator.

9. An apparatus as defined in claim 8 further comprising a frequency doubler coupled between the output of said A.C. signal generator and a second phase modulator which phase modulates said light at twice the frequency of said feedback signal.

10. An apparatus as defined in claim 9 further comprising a phase shift circuit for shifting the relative phase of the output of said A.C. signal generator and the output of said frequency doubler such that the phase modulation produced by the second phase modulaor has maxima and minima which corrspond in time with maxima, minima or zero crossings of the phase modulation produced by the first phase modulator.

11. An apparatus as defined in claim 1, wherein the linearity of the output signal is inversely related to the magnitude of said ambient effect.

12. In a fiber optic gyro having a loop of optical fiber for guiding a pair of counter-propagating light waves and a device for combining said waves to form an output light signal, an apparatus for sensing rotation-induced phase shifts between said waves, comprising:
a signal generator for providing first and second harmonic driving signals at first and second harmonic frequencies, respectively;
a first phase modulator driven by said first harmonic driving signal for phase modulating the counter-propagating light waves in said loop at said first harmonic frequency;
a second phase modulator driven by said second harmonic driving signal for phase modulating the counter-propagating light signals in said loop at said second harmonic frequency;
means for detecting the first harmonic component of said output light signal;
means, responsive to said detecting means, for controlling the amplitude of said second harmonic driving signal to reduce the amplitude of said first harmonic component in the output light signal substantially to zero; and
means for converting said second harmonic signal in accordance with a non-linear transfer function to indicate the rotation rate of said loop.

13. An apparatus as defined in claim 12 wherein said converting means includes a memory for storing rotation data related by said transfer function to said amplitude of said second harmonic signal, and further includes a microprocessor for converting said amplitude to an address in said memory where said rotation data is stored and for accessing said rotation data.

14. An apparatus as defined in claim 12 wherein said converting means comprises:
a lock-in amplifier coupled to said second harmonic driving signal and tuned to said second harmonic frequency;
an analog-to-digital converter for converting the output of said lock-in amplifier to digital data;
a memory for storing data comprising the rotation rates related by said transfer function to particular levels of said amplitude; and
a computer for converting said digital data from said analog to digital converter to an address in said memory storing the corresponding rotation rate data and for retrieving said rotation rate data.

15. An apparatus as defined in claim 12 wherein said transfer function is defined by the equation:

$$\tan\Delta\phi_R = \frac{\sum_{n=1}^{\infty}(-1)^{n+1}J_{2n-1}(\Delta\phi_2)\{J_{4n-3}(\Delta\phi_1) - J_{4n-1}(\Delta\phi_1)\}}{J_0(\Delta\phi_2)J_1(\Delta\phi_1) + \sum_{n=1}^{\infty}(-1)^{n+1}J_{2n}(\Delta\phi_2)\{J_{4n-1}(\Delta\phi_1) - J_{4n+1}(\Delta\phi_1)\}}$$

where:
$J_x$ = the Bessel function of the first kind defining the harmonic of x times said first frequency;
$\Delta\phi_R$ = the Sagnac phase shift caused by rotation;
$\Delta\phi_1$ = the amplitude of the first harmonic phase modulation;
$\Delta\phi_2$ = the amplitude of said second harmonic phase modulation.

16. An apparatus as defined in claim 13 or 14 or 15 wherein said detecting means generates a feedback error signal which is proportional to the amplitude of the first harmonic Fourier component of said output light signal and wherein said apparatus further includes an error correcting modulator electrically connected to said detecting means for controlling the amplitude of said second harmonic driving signal as a function of said feedback error signal in order to reduce said first harmonic component of said output light signal substantially to zero.

17. An apparatus as defined in claim 16 wherein said error correcting modulator increases or decreases the amplitude of said second harmonic driving signal in response to non-zero feedback error signals until said feedback error signal is substantially zero and then holds said second harmonic driving signal at this amplitude until said error signal again becomes non-zero.

18. An apparatus as defined in claim 17 wherein said error correcting modulator comprises a summing amplifier with said error feedback signal coupled to the inverting input of said summing amplifier.

19. An apparatus as defined in claim 17 wherein said error correcting modulator comprises an integrating operational amplifier with said feedback error signal coupled to the inverting input of said operational amplifier.

20. An apparatus as defined in claim 17 further comprising a phase shift means for shifting the phase of said second harmonic driving signal relative to said first harmonic driving signal such that maxima and minima of said second harmonic driving signal correspond in time with maxima, minima or zero crossings of said first harmonic driving signal.

21. An apparatus for sensing rotation rate comprising:
a loop of a fiber optic material for guiding counter-propagating light waves;
a first phase modulator for phase modulating said waves at a first frequency; and
means for combining said waves to form an optical output signal;
means for generating a feedback error signal proportional to the amplitude of the Fourier component in the optical output signal at said first frequency;
a second phase modulator for phase modulating said counter-propagating waves at a second frequency in response to a driving signal at said second frequency;
feedback means for adjusting the amplitude and phase of said driving signal at said second frequency so as to minimize the amplitude of said feedback error signal; and output means for converting, by means of a non-linear transfer function, the characteristics of said driving signal at said second frequency to data corresponding to the rotation rate of said loop.

22. An apparatus as defined in claim 21 wherein said output means comprises:

a memory for storing data in a plurality of addresses, each address corresponding to a different amplitude for said driving signal at said second frequency which minimizes said feedback error signal at a specific rotation rate, and each address storing data defining the specific rotation rate for the corresponding driving signal at said second frequency as defined by said transfer function; and means for determining the amplitude of said driving signal at said second frequency and for converting it to the corresponding address in said memory and for accessing the data in said address.

23. An apparatus as defined in claim 22 wherein said means for determining the amplitude includes a lock-in amplifier having its input coupled to said driving signal at said second frequency and having said second frequency as a reference input.

24. In a Sagnac rotation sensor having counterpropagating lightwaves phase modulated at a first frequency which are combined to form an optical output signal having a component at said first frequency, a method of determining a rotation rate comprising:

sensing the the component of the optical output signal at said first frequency;

phase modulating said counter-propagating light waves at a second frequency and at an amplitude and phase relative to said first frequency so as to cancel said component at said first frequency; and converting, through a non-linear transfer function, the characteristics of said phase modulation at said second frequency to the corresponding rotation rate causing said component at said first frequency.

25. A method of determining a rotation rate of a Sagnac fiber optic rotation sensor having counter-propagating waves which have phase modulation at a first frequency and which are combined to form an optical output signal, comprising:

phase modulating said counter-propagating waves at a second frequency, and at a cancellation amplitude selected so as to substantially cancel the component of said optical output signal at said first frequency caused by said rotation rate, said cancellation amplitude varying non-linearly with said rotation rate; and converting said cancellation amplitude of said second frequency phase modulation to the corresponding rotation rate.

26. The method of claim 25 wherein the conversion step comprises:

converting the cancellation amplitude of said second frequency phase modulation to an address in a memory which stores data defining the corresponding rotation rate for the particular cancellation amplitude corresponding to that address; and retrieving the data stored in said address.

27. The method of claim 25 wherein the conversion step comprises:

setting said cancellation amplitude as the variable $\Delta\phi_2$ and the amplitude of said first frequency phase modulation as $\Delta\phi_1$, and solving for $\Delta\phi_R$ in the following equation to determine said corresponding rotation rate:

$$\tan\Delta\phi_R = \frac{\sum_{n=1}^{\infty}(-1)^{n+1}J_{2n-1}(\Delta\phi_2)\{J_{4n-3}(\Delta\phi_1) - J_{4n-1}(\Delta\phi_1)\}}{J_0(\Delta\phi_2)J_1(\Delta\phi_1) + \sum_{n=1}^{\infty}(-1)^{n+1}J_{2n}(\Delta\phi_2)\{J_{4n-1}(\Delta\phi_1) - J_{4n+1}(\Delta\phi_1)\}}$$

where $J_x$ equals the Bessel function of the first kind defining the harmonic of x times said first frequency.

28. A method for sensing the rotation rate of a gyroscope having a loop of fiber optic material, the method comprising the steps of:

introducing a light wave into said loop;

sensing the light wave in the loop to produce a first signal responsive to rotation of said loop;

producing a second signal related to the rotation rate of the loop, said second signal responsive to the first signal and tending to null said first signal; and superimposing a non-linear transfer function on the second signal to translate said signal to a rotation signal proportional to the rotation rate of the loop.

29. A method as defined in claim 28, wherein the superimposing step includes the step of converting the magnitude of the second signal to an address of a location within an electronic data storage device, said data storage device containing data relating the magnitude of said second signal to rotation rate according to the transfer function, and wherein the superimposing step further comprises the step of providing data at the location in the data storage device as an output signal corresponding to the rotation rate.

30. In a fiber optic sensor for sensing an ambient effect such as rotation, said sensor comprising means for guiding a pair of light waves and means for combining said lightwaves to form an optical output signal responsive to said ambient effect, an apparatus for extending the sensing range of said sensor, comprising:

means for driving said optical output signal towards a predetermined value in response to variations in said ambient effect, said driving means producing a signal which varies non-linearly with said ambient effect; and means responsive to said non-linear signal produced by said driving means, for indicating said ambient effect.

31. An apparatus, as defined in claim 30, wherein said signal varies with said ambient effect in accordance with a Bessel function relationship.

32. An apparatus, as defined by claim 30, wherein said driving means comprises phase modulation means.

33. An apparatus, as defined by claim 30, wherein the phase modulation means comprises first and second phase modulators driven at first and second harmonically related frequencies, respectively.

34. An apparatus, as defined by claim 30, wherein the linearity of said signal produced by said driving means is inversely related to the magnitude of the ambient effect.

* * * * *